(12) United States Patent
Mansfield et al.

(10) Patent No.: US 6,301,249 B1
(45) Date of Patent: *Oct. 9, 2001

(54) EFFICIENT ERROR CONTROL FOR WIRELESS PACKET TRANSMISSIONS

(75) Inventors: Carl Mansfield, Portland, OR (US); Izzet M. Bilgic, Colorado Springs, CO (US); Benjamin K. Gibbs, Colorado Springs, CO (US); Sherman L. Gavette, Colorado Springs, CO (US)

(73) Assignee: Opuswave Networks, Inc, Colorado Springs, CO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/128,739

(22) Filed: Aug. 4, 1998

(51) Int. Cl.⁷ .................................................. H04L 12/28
(52) U.S. Cl. ............................................. 370/394; 714/748
(58) Field of Search ............................. 370/395, 394, 370/465, 470, 471, 472, 473, 474, 475, 476, 352; 371/30, 31, 32, 33; 714/100, 1, 2, 746–754

(56) References Cited

U.S. PATENT DOCUMENTS

| | | | |
|---|---|---|---|
| 5,130,986 | * 7/1992 | Doshi et al. | 370/394 |
| 5,222,061 | * 6/1993 | Doshi et al. | 370/394 |
| 5,487,068 | * 1/1996 | Smolinske et al. | 370/468 |
| 5,555,266 | 9/1996 | Buchholz et al. | 370/394 |

* cited by examiner

Primary Examiner—Ajit Patel

(57) ABSTRACT

A method of transmission error control includes transmitting at least one frame of packet data to a receiving entity during each of a plurality of time frames, and receiving a plurality of responsive messages from the receiving entity. Each of the responsive messages identifies frames of data successfully received during a current time frame and during prior time frames. The method also includes retransmitting each of the frames of data that the responsive message does not indicate as successfully received.

19 Claims, 17 Drawing Sheets

452

| | Bit | | | | | | | | |
|---|---|---|---|---|---|---|---|---|---|
| | 8 | 7 | 6 | 5 | 4 | 3 | 2 | 1 | |
| Octet 1 | Message Type | | | | | | | | |
| Octet 2 | 0 | 0 | 0 | 1 | 1 | 1 | 1 | 1 | 480 |
| Octet 3 | 0 | 0 | 0 | 0 | 0 | 0 | 0 | 0 | |
| Octet 4 | 0 | 0 | 0 | 0 | 0 | 0 | 0 | 0 | |
| Octet 5 | 0 | 0 | 0 | 0 | 0 | 0 | 0 | 0 | |
| Octet 6 | 0 | 0 | 0 | 0 | 0 | 0 | 0 | 0 | 590 |
| Octet 7 | 0 | 0 | 0 | 0 | 0 | 0 | 0 | 0 | |
| Octet 8 | 0 | 0 | 0 | 0 | 0 | 0 | 0 | 0 | |
| Octet 9 | 0 | 0 | 0 | 0 | 0 | 0 | 0 | 0 | |
| Octet 10 | 0 | 0 | 0 | 0 | 0 | 0 | 0 | 0 | |
| Octet 11 | 0 | 0 | 0 | 0 | 0 | 0 | 0 | 0 | |
| Octet 12 | • • • | | | | • • • | | | | |
| Spare 13-20 | | | | | | | | | |

| | Bit | | | | | | | | |
|---|---|---|---|---|---|---|---|---|---|
| | 8 | 7 | 6 | 5 | 4 | 3 | 2 | 1 | |
| Octet 1 | Message Type | | | | | | | | |
| Octet 2 | 1 | 1 | 1 | 1 | 1 | 1 | 1 | 1 | 481 |
| Octet 3 | 0 | 0 | 0 | 0 | 0 | 0 | 1 | 1 | 482 |
| Octet 4 | 0 | 0 | 0 | 0 | 0 | 0 | 0 | 0 | |
| Octet 5 | 0 | 0 | 0 | 0 | 0 | 0 | 0 | 0 | |
| Octet 6 | 0 | 0 | 0 | 0 | 0 | 0 | 0 | 0 | |
| Octet 7 | 0 | 0 | 0 | 0 | 0 | 0 | 0 | 0 | 486 |
| Octet 8 | 0 | 0 | 0 | 0 | 0 | 0 | 0 | 0 | |
| Octet 9 | 0 | 0 | 0 | 0 | 0 | 0 | 0 | 0 | |
| Octet 10 | 0 | 0 | 0 | 0 | 0 | 0 | 0 | 0 | |
| Octet 11 | 0 | 0 | 0 | 0 | 0 | 0 | 0 | 0 | |
| Octet 12 | • • • | | | | • • • | | | | |
| Spare 13-20 | | | | | | | | | |

| | Bit 8 | 7 | 6 | 5 | 4 | 3 | 2 | 1 | |
|---|---|---|---|---|---|---|---|---|---|
| Octet 1 | 554 — Message Type 553, 551, 552, 550 | | | | | | | | |
| Octet 2 | 0 | 0 | 0 | 0 | 0 | 1 | 0 | 1 | 556 |
| Octet 3 | 0 | 0 | 0 | 0 | 0 | 0 | 0 | 0 | |
| Octet 4 | 0 | 0 | 0 | 0 | 0 | 0 | 0 | 0 | |
| Octet 5 | 0 | 0 | 0 | 0 | 0 | 0 | 0 | 0 | |
| Octet 6 | 0 | 0 | 0 | 0 | 0 | 0 | 0 | 0 | |
| Octet 7 | 0 | 0 | 0 | 0 | 0 | 0 | 0 | 0 | 590 |
| Octet 8 | 0 | 0 | 0 | 0 | 0 | 0 | 0 | 0 | |
| Octet 9 | 0 | 0 | 0 | 0 | 0 | 0 | 0 | 0 | |
| Octet 10 | 0 | 0 | 0 | 0 | 0 | 0 | 0 | 0 | |
| Octet 11 | 0 | 0 | 0 | 0 | 0 | 0 | 0 | 0 | |
| Octet 12 | ••• | | | ••• | | | | | |
| Spare 13-20 | | | | | | | | | |

| | Bit 8 | 7 | 6 | 5 | 4 | 3 | 2 | 1 | |
|---|---|---|---|---|---|---|---|---|---|
| Octet 1 | 561 Message Type | | | | | | | | |
| Octet 2 | 1 | 0 | 1 | 0 | 0 | 1 | 0 | 1 | 555 |
| Octet 3 | 0 | 0 | 0 | 0 | 0 | 0 | 0 | 1 | 557 |
| Octet 4 | 0 | 0 | 0 | 0 | 0 | 0 | 0 | 0 | |
| Octet 5 | 0 | 0 | 0 | 0 | 0 | 0 | 0 | 0 | |
| Octet 6 | 0 | 0 | 0 | 0 | 0 | 0 | 0 | 0 | |
| Octet 7 | 0 | 0 | 0 | 0 | 0 | 0 | 0 | 0 | 595 |
| Octet 8 | 0 | 0 | 0 | 0 | 0 | 0 | 0 | 0 | |
| Octet 9 | 0 | 0 | 0 | 0 | 0 | 0 | 0 | 0 | |
| Octet 10 | 0 | 0 | 0 | 0 | 0 | 0 | 0 | 0 | |
| Octet 11 | 0 | 0 | 0 | 0 | 0 | 0 | 0 | 0 | |
| Octet 12 | ••• | | | ••• | | | | | |
| Spare 13-20 | | | | | | | | | |

527 ↘

| Octet | BIT 8 | 7 | 6 | 5 | 4 | 3 | 2 | 1 | |
|---|---|---|---|---|---|---|---|---|---|
| Octet 1 | Message Type | | | | | | | 571 | |
| Octet 2 | 1 | 0 | 1 | 0 | 0 | 1 | 0 | 1 | ~562 |
| Octet 3 | 0 | 1 | 1 | 1 | 1 | 1 | 0 | 1 | ~563 |
| Octet 4 | 0 | 0 | 0 | 0 | 0 | 0 | 0 | 0 | |
| Octet 5 | 0 | 0 | 0 | 0 | 0 | 0 | 0 | 0 | |
| Octet 6 | 0 | 0 | 0 | 0 | 0 | 0 | 0 | 0 | |
| Octet 7 | 0 | 0 | 0 | 0 | 0 | 0 | 0 | 0 | 600 |
| Octet 8 | 0 | 0 | 0 | 0 | 0 | 0 | 0 | 0 | |
| Octet 9 | 0 | 0 | 0 | 0 | 0 | 0 | 0 | 0 | |
| Octet 10 | 0 | 0 | 0 | 0 | 0 | 0 | 0 | 0 | |
| Octet 11 | 0 | 0 | 0 | 0 | 0 | 0 | 0 | 0 | |
| Octet 12 | • • • | | | | • • • | | | | |
| Spare 13-20 | | | | | | | | | |

| Octet | BIT 8 | 7 | 6 | 5 | 4 | 3 | 2 | 1 | |
|---|---|---|---|---|---|---|---|---|---|
| Octet 1 | Message Type | | | | | | | | |
| Octet 2 | 1 | 1 | 1 | 1 | 1 | 1 | 1 | 1 | ~580 |
| Octet 3 | 0 | 1 | 1 | 1 | 1 | 1 | 1 | 1 | ~581 |
| Octet 4 | 0 | 0 | 0 | 0 | 0 | 0 | 0 | 0 | |
| Octet 5 | 0 | 0 | 0 | 0 | 0 | 0 | 0 | 0 | |
| Octet 6 | 0 | 0 | 0 | 0 | 0 | 0 | 0 | 0 | |
| Octet 7 | 0 | 0 | 0 | 0 | 0 | 0 | 0 | 0 | 605 |
| Octet 8 | 0 | 0 | 0 | 0 | 0 | 0 | 0 | 0 | |
| Octet 9 | 0 | 0 | 0 | 0 | 0 | 0 | 0 | 0 | |
| Octet 10 | 0 | 0 | 0 | 0 | 0 | 0 | 0 | 0 | |
| Octet 11 | 0 | 0 | 0 | 0 | 0 | 0 | 0 | 0 | |
| Octet 12 | • • • | | | | • • • | | | | |
| Spare 13-20 | | | | | | | | | |

EFFICIENT ERROR CONTROL FOR WIRELESS PACKET TRANSMISSIONS

FIELD OF THE INVENTION

The field of this invention pertains to telecommunications, including a telecommunications system that includes efficient error control for packet transmissions.

DESCRIPTION OF THE TECHNOLOGY

Generally, known communication systems provide transmission error correction of packet data, i.e., messages transmitted in a packetized format, through the use of standard automatic repeat request ("ARQ") mechanisms, also known as backward error correction mechanisms. In wireline systems, ARQ mechanisms are thought to be fairly effective, as, generally, wireline channels experience relatively low transmission error rates.

In wireless networks, or systems, however, the radio channel, or over-the-air interface, is characterized by a considerably elevated transmission error rate compared to a wireline channel. This, in turn, tends to reduce the effectiveness of standard ARQ mechanisms, as the probability of ever successfully transmitting a frame, i.e., a portion of packet data, also referred to as a data segment, error free may be very low. The overall impact may be either a serious reduction in system throughput and an increase in delay, or, possibly, total system collapse.

Known systems employing transmission error control also may provide a cyclic redundancy code ("CRC") for error detection. Generally, a cyclic redundancy code is a type of frame check sequence computed by treating data bit strings as polynomials with binary coefficients, and performing a mathematical calculation thereon. A CRC, therefore, is basically a code that is transmitted along with a frame, or data segment, to enable the receiver to detect data corruption.

Known systems employing transmission error control also generally provide a mechanism for signaling failures, which are used to trigger retransmissions. Most known data system retransmission policies fall into one of the two following categories.

The first known retransmission category is a "stop and wait" protocol. In a stop and wait protocol, each frame must be explicitly acknowledged before the next can be sent.

As shown in FIG. 1, wherein a stop and wait protocol is employed in an exemplary transmission sequence 1, an acknowledge ("ack") message is sent in response to every successful frame transmission. Thus, ack1 message 10 is transmitted in response to the successful receipt of frame 5, ack2 message 20 is transmitted in response to the successful receipt of frame 15, ack3 message 30 is transmitted in response to the successful receipt of frame 25, and so on.

FIG. 1, depicting successful transmission conditions, shows that even under favorable conditions, with a stop and wait protocol the data transmission throughput is generally poor. Only one data frame is generally transmitted per time frame 50. Too, an acknowledge message must be sent in each time frame, in response to the data transmission in that time frame, causing additional message traffic on what may already be a scarce resource.

Thus, using a stop and wait protocol, it can take fifteen time frames to transmit a packet data segmented into fifteen frames. And the transmission sequence 1 is shown under favorable transmission conditions, i.e., all data transmissions are successful on the first attempt.

FIG. 2 shows the poor throughput performance of packet data transmissions using a stop and wait protocol for an exemplary transmission scenario 59 when there are errors in the transmission of one or more frames. In FIG. 2, like FIG. 1, the first frame, or data sequence, 60 is successfully transmitted, and an acknowledge message ack1 62 is sent in response. However, in transmission scenario 59, the second frame 64 is unsuccessfully transmitted, and a negative acknowledge ("nack") message nack2 66 is sent in response. Receipt of the nack2 66 triggers the entity transmitting the packet data to transmit the second frame a second time (message 68). On the second attempt, the second frame 68 is successfully transmitted and an acknowledge message ack2 70 is sent in response. However, because the initial transmission of the second frame 64 was unsuccessful, it has taken three time frames 140 to successfully transmit two frames of data.

Further, in FIG. 2, while the third frame 72 is successfully transmitted, with an acknowledge message ack3 74 sent in response, the fourth frame 76 is unsuccessfully transmitted, with a negative acknowledge message nack4 78 sent in response. Receipt of the nack4 78 triggers the entity transmitting the packet data to transmit the fourth frame a second time (message 80). On the second attempt in exemplary traffic scenario 59, the fourth frame 80 is successfully transmitted and an acknowledge message ack4 82 is sent in response. As both the initial transmission of the second frame 64 and the fourth frame 76 were unsuccessful, it has taken six time frames 140 to successfully transmit four frames of data.

In the same scenario 59, the fifth frame 84 is unsuccessfully transmitted on the first attempt, and a negative acknowledge message nack5 86 is sent in response. Receipt of the nack5 86, like receipt of the other negative acknowledge messages, triggers the entity transmitting the packet data to retransmit the fifth frame a second time (message 88). On the second attempt in scenario 59, the fifth frame 88 is successfully transmitted and an acknowledge message ack5 90 is sent in response. However, as the initial transmission of the second frame 64, the fourth frame 76 and the fifth frame 84 were unsuccessful, it has taken eight time frames 140 to successfully transmit five frames of data.

The sixth frame 92 of scenario 59 is successfully transmitted, and an acknowledge message ack6 94 is sent in response. The seventh frame 96, however, is unsuccessfully transmitted, and a negative acknowledge message nack7 98 is sent in response. Upon receiving the nack7 98, the entity transmitting the packet data transmits the seventh frame once again (message 100). On the second attempt in scenario 59, the seventh frame 100 is successfully transmitted and an acknowledge message ack7 102 is sent in response. However, it has now taken eleven time frames to successfully transmit only seven frames of data.

The eighth frame 104 and the ninth frame 108 are both successfully transmitted on the first attempt in scenario 59, with an acknowledge message ack8 106 and ack9 110 respectively sent in response. However, the initial transmission of the tenth frame 112 is unsuccessful, and a negative acknowledge message nack10 114 is sent in response. Upon receipt of the nack10 114, the entity transmitting the packet data transmits the tenth frame again (message 116), in the subsequent time frame. On the second attempt, the tenth frame 116 is successfully transmitted and an acknowledge message ack10 118 is sent in response. However, it has taken fifteen time frames to successfully send just ten frames of data.

In traffic scenario 59, the remaining five frames 120, 124, 128, 132 and 136 of the packet data are successfully transmitted on the first attempt, with respective acknowledge messages 122, 126, 130, 134 and 138 sent in response.

With a stop and wait protocol, where several frame transmissions are unsuccessfully transmitted on an initial attempt, several additional transmissions and a significantly longer time to successfully transmit the entire packet data results. Specifically, as well as frames 64, 76, 84, 96 and 112 of scenario 59 requiring subsequent retransmission, five negative acknowledge messages are transmitted and five additional acknowledgment messages are also transmitted. Also, in scenario 59, twenty time frames are required to transmit fifteen frames of data.

Thus, with a stop and wait protocol, as the data transmission error rate increases, the additional message transmission count and the delay in finalizing transmission of data packets also increases. Use of stop and wait protocols, therefore, generally results in poor transmission throughput performance under the best of conditions, which is only further degraded as transmission conditions degenerate.

Also with a stop and wait protocol, generally not more than one or two frames of data of a packet data can be sent in a time frame. This provides simplicity of implementation and operation. It is also the result of timing issues involved in successfully receiving a frame and processing an acknowledge message response, or alternatively, realizing that a frame that should have been transmitted has not been received, and processing a negative acknowledge response. This limitation, however, limits packet data throughput and reduces the flexibility of the transmission system.

Too, the use of a stop and wait protocol requires that frames of packet data be transmitted sequentially, e.g., for example, a third frame of a packet data can not be transmitted prior to the transmission of the first and second frames. This limitation, in turn, reduces the flexibility of the transmission system.

The other known retransmission category is a "window" protocol. In a window protocol, a number of transmitted frames can be outstanding, i.e., unacknowledged, and transmission errors can be discovered by the lack of acknowledgement, which generally triggers a "go back N" frames and retransmit response. Alternatively, transmission errors may be discovered by the receipt of a selective reject mechanism, which generally triggers selective retransmission of the indicated missing frame.

As shown in the exemplary transmission scenario 201 of FIG. 3, wherein a window protocol is employed, more than one frame of packet data may be sent in a time frame and one acknowledge message is used to acknowledge the successful transmission of the sequential frames successfully transmitted.

Scenario 201 depicts a transmission scenario under favorable conditions; i.e., each frame of data in the packet data is successfully transmitted, and received, on a first attempt. Thus, ack1 message 210 is sent in response to the successful transmission of a first group of five frames of data 205 in time frame 215. The ack1 message 210 acknowledges the successful transmission of the fifth frame 202, and, thereby, also acknowledges the successful transmission of all preceding frames (203, 204, 206 and 207) of the first group of five frames of data 205.

In scenario 201, the ack2 message 225 is sent in response to the successful transmission of the entire second group of five frames of data 220 in time frame 230. The ack2 message 225 acknowledges the successful transmission of the tenth frame 208, and, thereby, also acknowledges the successful transmission of the preceding frames 209, 211, 212 and 213 of the second group of five frames of data 220, as well as the entire first group of five frames of data 205.

The ack3 message 240 is responsive to the successful transmission of the third group of five frames of data 235 in time frame 245. The ack3 message 240 acknowledges the successful transmission of the fifteenth frame 214, and, thereby, also acknowledges the successful transmission of the preceding frames 216, 217, 218 and 219 of the third group of five frames of data 235, as well as the first group of five frames of data 205 and the second group of five frames of data 220.

In scenario 201, fifteen frames of packet data are successfully transmitted in three time frames. However, under less favorable conditions, as are generally expected on a wireless interface, the inadequacies of a window protocol become apparent.

Referring to FIG. 4, a window protocol in which error transmissions are discovered by the lack of acknowledgement is depicted in exemplary traffic scenario 269 which includes data transmission errors. In scenario 269, a first group of five frames of data 304 is transmitted in time frame 270. However, the second frame 276, the fourth frame 278, and the fifth frame 279 in group 304 are unsuccessfully transmitted. Thus, the receiving entity only acknowledges the successful transmission of the first frame 275, with ack1 message 280.

As the acknowledge messages in a window protocol in which error transmissions are discovered by the lack of acknowledgement acknowledge the last sequential frame in a packet data to be successfully transmitted, the ack1 message 280 only acknowledges the first frame 275. Although the third frame 277 was also successfully transmitted, the second frame 276 was not, and thus, the third frame 277 is not acknowledged as it is not the last sequential frame to be successfully transmitted.

In scenario 269, a second group of five frames of data 305 is transmitted in a second time frame 271. The second group of five frames of data 305 is comprised of the second through sixth frames (281–285), as these are the subsequent sequential frames after the only acknowledged first frame 275. In scenario 269, all five frames of data 305 of the second group are successfully transmitted. Thus, the receiving entity transmits an ack2 message 286 acknowledging the successful transmission of the sixth frame 285. The ack2 message 286 thereby also acknowledges the successful transmission of the other four frames transmitted in time frame 271, i.e., frames 281–284. The ack2 message 286 further acknowledges the previous successful transmission of the first frame 275.

A third group of five frames of data 306 is transmitted in a third time frame 272. The third group of five frames of data 306 is comprised of the seventh through eleventh frames (287–291), as these are the subsequent sequential frames after the acknowledged sixth frame 285. In scenario 269, the seventh frame 287 and the tenth frame 290 are unsuccessfully transmitted. Thus, the receiving entity only acknowledges the successful transmission of the preceding sixth frame 285 with the ack3 message 292.

As the acknowledge messages in a window protocol in which error transmissions are discovered by the lack of acknowledgement acknowledge the last sequential frame in a packet data to be successfully transmitted, the ack3 message 292 acknowledges the sixth frame 285. Although the eighth frame 288, the ninth frame 289 and the eleventh frame 291 were also successfully transmitted, the seventh frame 287 was not. Thus, the eighth frame 288, the ninth frame 289 and the eleventh frame 291 are not acknowledged in time frame 272 as none of these frames are the last sequential frame to be successfully transmitted at the time.

In scenario 269, a fourth group of five frames of data 307 is transmitted in a fourth time frame 273. The fourth group of five frames of data 307 is comprised of the seventh through eleventh frames (293–297), as these are the subsequent sequential frames after the last acknowledged sixth frame 285. In scenario 269, all five frames of data 307 of the fourth group are successfully transmitted. Thus, the receiving entity transmits an ack4 message 298 acknowledging the successful transmission of the eleventh frame 297. The ack4 message 298 thereby also acknowledges the successful transmission of the seventh, eighth, ninth and tenth frames (293–296 respectively), as well as the first through sixth frames (275 and 281–285 respectively).

A fifth group of frames of data 308 is transmitted in a fifth time frame 274. The fifth group of frames of data 308 is comprised of the twelfth through fifteenth frames (299–302) of the packet data, as these are the subsequent sequential frames after the acknowledged eleventh frame 297. The fifth group of frames of data 308 is comprised of only four frames in scenario 269 as there are only four remaining frames in the packet data of fifteen frames to be transmitted at the time.

In scenario 269, all four frames of data of the fifth group 308 are successfully transmitted. Thus, the receiving entity transmits an ack5 message 303 acknowledging the successful transmission of the fifteenth frame 302. The ack5 message 303 thereby also acknowledges the successful transmission of the first fourteen frames of data (275, 281–285, 293–297 and 299–301 respectively).

Employing a window protocol with lack of an acknowledge response triggering retransmission results in successfully transmitted frames being retransmitted, consuming valuable resources. Thus, while not shown in exemplary scenario 269, a frame which was successfully transmitted a first time may be unsuccessfully transmitted a second time, triggering repeated transmissions of the same frames. Also, as with the stop and wait protocol, the window protocol with lack of an acknowledgement response triggering retransmission requires that frames of packet data be transmitted sequentially, e.g., for example, a third frame of a packet data can not be transmitted prior to the transmission of the first and second frames. This limitation generally reduces the flexibility of the transmission system.

Additionally, as the window, i.e., frames of data transmitted between acknowledgements, in a window protocol with lack of acknowledgement response triggering retransmission is increased the window protocol will generally require still more successfully transmitted frames to be retransmitted. This can result in an increased burden on what may generally be scarce resources.

For example, referring to exemplary scenario 310 in FIG. 5, acknowledgement messages are sent only every second time frame. Assuming, as with scenario 269 in FIG. 4, that five frames of data are transmitted per time frame, a first group 311 of the first five frames of packet data is transmitted in time frame 314 and a second group 312 of the second five frames is transmitted in time frame 315. In scenario 310, similar to scenario 269 of FIG. 4, the second frame 321, the fourth frame 323 and the fifth frame 324 are unsuccessfully transmitted on the first transmission attempt. Thus, the receiving entity only acknowledges the successful transmission of the first frame 320 with the ack1 message 330.

In scenario 310, the transmitting entity then sends a third group 331 of five frames of data in a third time frame 316.

The third group 331 of five frames of data comprises the second through sixth frames (332–336 respectively). The transmitting entity sends a fourth group 337 of five frames of data in a fourth time frame 317. The fourth group 337 of five frames of data comprises the seventh through eleventh frames (338–342 respectively).

In scenario 310, similar to scenario 269 of FIG. 4, the seventh frame 338 and the tenth frame 341 are unsuccessfully transmitted on the first transmission attempt. Thus, the receiving entity acknowledges only up to the sixth sequential frame 336. The ack2 message 343 acknowledges the successful transmission of the sixth frame 336, thereby also acknowledging the successful transmission of the first through fifth frames (320 and 332–335 respectively).

The transmitting entity thereafter sends a fifth group 344 of five frames of data in a fifth time frame 318. The fifth group 344 of five frames of data comprises the seventh through eleventh frames (345–349 respectively). The transmitting entity sends a sixth group 390 of frames of data in a sixth time frame 319. The sixth group 390 of frames of data comprises the twelfth through fifteenth frames (385–388 respectively). The sixth group of frames of data 390 is comprised of only four frames in scenario 310 as there are only four remaining frames in the packet data of fifteen frames to be transmitted at the time.

In scenario 310, all five frames of data 344 of the fifth group are successfully transmitted and all four frames of data 390 of the sixth group are also successfully transmitted. Thus, the receiving entity transmits an ack3 message 389 acknowledging the successful transmission of the fifteenth frame 388. The ack3 message 389 thereby also acknowledges the successful transmission of the first fourteen frames of data (320, 332–336, 345–349 and 385–387 respectively).

As can be seen in scenario 310, using this window protocol has required six time frames to successfully transmit, and acknowledge receipt thereof, packet data of fifteen frames. Moreover, as with the previous window protocol message scenario 269, in scenario 310 successfully transmitted messages are required to be retransmitted.

Thus, the larger the window in this window protocol, the more time which will generally be necessary to successfully transmit and acknowledge packet data. On the other hand, with this window protocol and a smaller window, even more time is generally required to transmit packet data. Further, if the window is made small enough, i.e., a one frame window, the resultant protocol will generally be similar to the wait and see protocol previously discussed. In this case, the only difference between the two protocols would be that, instead of receiving a negative acknowledge message if the previous frame is transmitted in error, as with the wait and see protocol, an acknowledge message indicating the last sequential successfully transmitted frame is transmitted in the window protocol.

Referring to FIG. 6, exemplary traffic scenario 380 uses a window protocol in which error transmissions are selectively rejected. In scenario 380, five frames of packet data are transmitted per time frame, and transmission errors do occur. A first group 382 of five frames of data is transmitted in a first time frame 350 of scenario 380. In this scenario 380, the second frame 351, the fourth frame 352, and the fifth frame 353 in group 382 are all unsuccessfully transmitted on the first transmission attempt. The receiving entity, therefore, sends a negative acknowledge message nack2 354, selectively rejecting the frame of data 351 (frame two) first transmitted in error.

In response to the nack2 354, the packet data transmitting entity transmits frame two of the packet data a second time (message 356), in a second time frame 355. In time frame 355, the packet data transmitting entity also transmits the sixth, seventh, eighth and ninth frames, thereby transmitting a total of five frames of data in time frame 355.

As in prior exemplary scenarios, the seventh frame 357 is transmitted in error. However, at this time, the receiving entity sends a negative acknowledge message nack4 358, selectively rejecting frame four 352 of data that was the second frame previously transmitted in error, in time frame 350.

In response to the nack4 358, the packet data transmitting entity transmits frame four of the packet data a second time (message 359), in a third time frame 360. In time frame 360, the packet data transmitting entity also transmits the tenth, eleventh, twelfth and thirteenth frames of data, thereby transmitting a total of five frames of data in time frame 360.

As in prior exemplary scenarios, the tenth frame 361 is transmitted in error. However, the receiving entity sends a negative acknowledge message nack5 362, selectively rejecting frame five 353 of data that was the third frame previously transmitted in error, in the first time frame 350.

In response to the nack5 362, the packet data transmission entity transmits frame five of the packet data a second time (message 363), in a fourth time frame 365. In time frame 365, the packet data transmission entity also transmits the final two frames of the packet data. Although all three frames of data are successfully transmitted in time frame 365, the receiving entity sends a negative acknowledge message nack7 364 response, indicating that frame seven 357 of data was the fourth frame previously unsuccessfully transmitted, in the time frame 355.

Upon receiving the nack7 364, the packet data transmitting entity transmits frame seven of the packet data a second time (message 366), in a fifth time frame 370. As the entity transmitting the packet data is unaware of any other frames requiring transmission, it transmits no other frames of data in time frame 370.

Transmission of frame seven 366 in time frame 370 is successful in scenario 380. However, the receiving entity sends a negative acknowledge message nack10 367 in time frame 370, indicating the prior unsuccessful transmission of frame ten 361 of data, the fifth frame previously unsuccessfully transmitted, in the time frame 360. In response, in the following time frame 375, the packet data transmitting entity transmits frame ten of the packet data a second time (message 368). The second transmission of frame ten 368 is successful, and the receiving entity thereafter acknowledges successful transmission of the packet data by sending an acknowledge message ack1 369 in time frame 375.

No frames of data are unnecessarily retransmitted with a window protocol with selective retransmission. However, in a typical scenario 380, it required six time frames to transmit fifteen frames of data. Moreover, a negative acknowledge message is required for each frame of data unsuccessfully transmitted. Thus, the more errors on the transmission channel, the more negative acknowledge messages, and thus, the more control message traffic that is required to successfully complete a packet data transmission.

A problem with known window protocols is that frames of data are often unnecessarily retransmitted and/or additional time frames are required to successfully transmit the packet data. Thus, although the window protocols are more efficient for packet data transmissions than the wait and see protocol, they are also more complex, requiring additional processing by those entities employing them. In addition, the window protocols are still not generally efficient enough to handle error processing in a wireless transmission environment.

As previously indicated, a problem with known window protocols is that the associated state machines for implementing them in a system are generally quite complex. With window protocols, both the receiving and transmitting sides must store send and receive packet sequence numbers and next expected packet sequence numbers, and both sides must have the capability to signal to negotiate the window size and other relevant parameters. Further, large amounts of data may need to be buffered at both sides (transmitting and receiving) in a window protocol scheme, requiring increased memory usage and maintenance. Large amounts of data are not generally required to be buffered in a wait and see protocol. However, as previously discussed, with a wait and see protocol, transmission throughput is generally less efficient, especially in a wireless system.

The problems with stop and wait protocols and window protocols are generally particularly acute in wireless systems, due to the scarcity of radio resources.

Thus, it would be advantageous to provide an error control mechanism for use in a wireless packet data system that improves performance when compared to existing error correction schemes. Specifically, it is advantageous to provide an error control mechanism that minimizes the complexity of the system generally required in schemes employing window protocols, while providing better performance than simple wait and see schemes. It is also advantageous to provide an error control mechanism that limits the number of messages required for error transmission detection and correction. Further, it is advantageous to provide an error control mechanism that can be used in low cost terminals while providing better performance than schemes employing wait and see protocols.

SUMMARY OF THE INVENTION

The inventions provide methods and mechanisms for error control in a communication system where a group of more than one message is transmitted by one entity, i.e., a transmitting entity, either in the communication system or linked thereto, to a second entity, i.e., a receiving entity, also either in the communication system or linked thereto.

In a presently preferred embodiment, a transmitting entity transmits a group of more than one user message, e.g., frames of packet data, to a receiving entity. The receiving entity, for its part, generates a responsive message to transmit in response to the transmission of the group of messages. The responsive message indicates each message in the group of messages that was successfully transmitted to the receiving entity, if any. Thus, the responsive message is also indicative of each message in the group of messages that was unsuccessfully transmitted to the receiving entity, if any. After generating the responsive message, the receiving entity transmits it to the transmitting entity.

The transmitting entity, upon receiving the responsive message, determines which, if any, of the group of messages was successfully transmitted to the receiving entity. The transmitting entity does not retransmit any of these successfully transmitted messages.

The transmitting entity also determines from the responsive message which, if any, of the group of messages was unsuccessfully transmitted to the receiving entity. The transmitting entity thereafter retransmits each of the messages that was previously unsuccessfully transmitted.

Thus, in a presently preferred embodiment, a responsive message is indicative of the unsuccessful transmission of one or more specific messages of a group of transmitted messages. This provides for the retransmission of only those messages of the group of messages that were previously unsuccessfully transmitted.

A general object of the inventions is to provide a transmission error control method and mechanism that allows for increased throughput of transmission traffic by reducing the overhead, i.e., control message, traffic required for transmission error control. A further general object of the inventions is to provide an error control method and mechanism that minimizes the complexity of a system managing transmissions between various entities. Other and further objects, features, aspects and advantages of the inventions will become better understood with the following detailed description of the accompanying drawings.

BRIEF DESCRIPTION OF THE DRAWINGS

FIGS. 9A, 9B and 9C are exemplary aggregated acknowledgment messages for the traffic scenario of FIG. 8.

FIGS. 11A, 11B, 11C and 11D are exemplary aggregated acknowledgement messages for the traffic scenario of FIG. 10.

DESCRIPTION OF THE PREFERRED EMBODIMENTS

Figure 1:
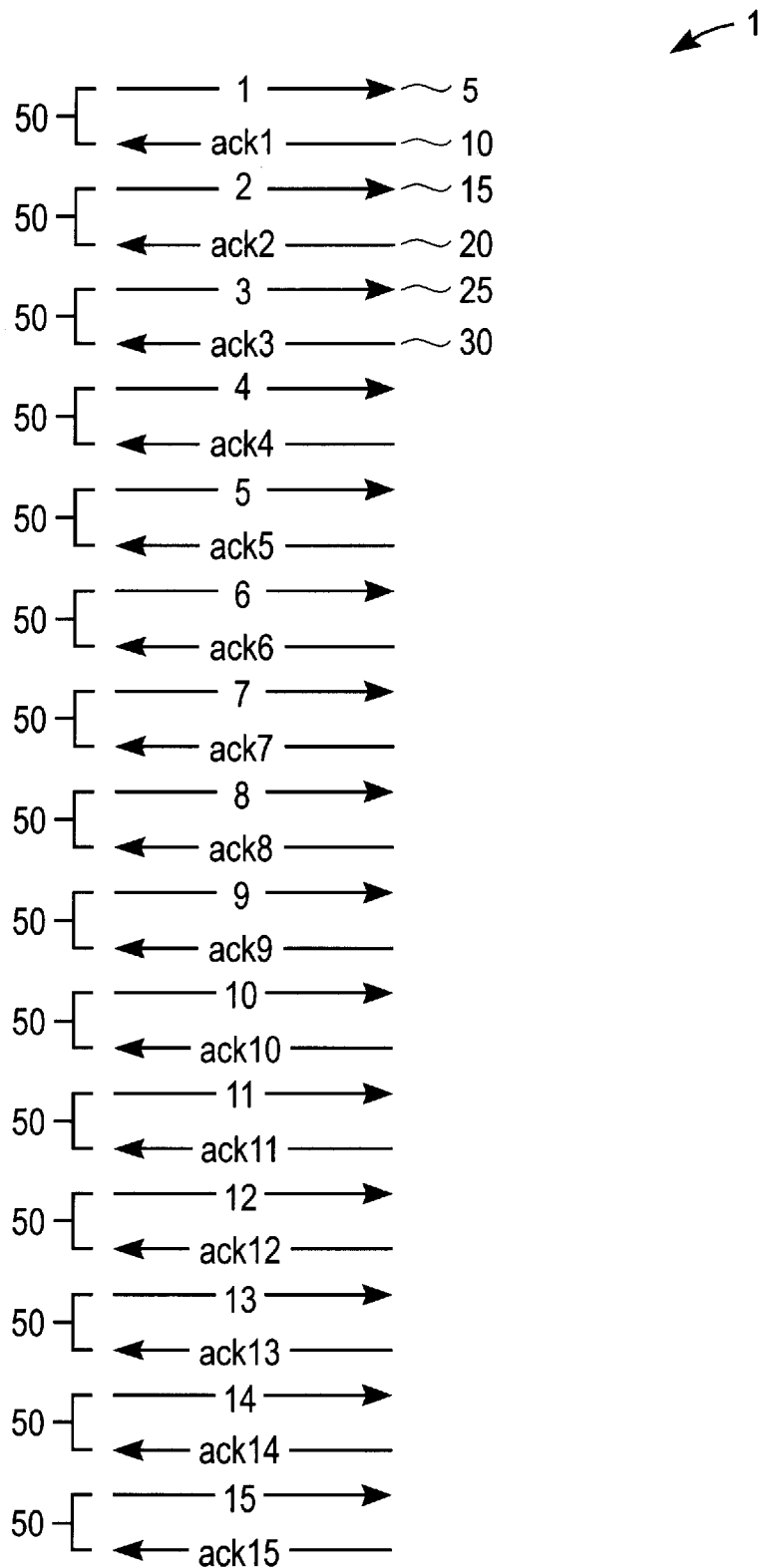
FIG. 1 is an exemplary traffic scenario using a wait and see protocol, where there are no errors in transmission.
Figure 2:
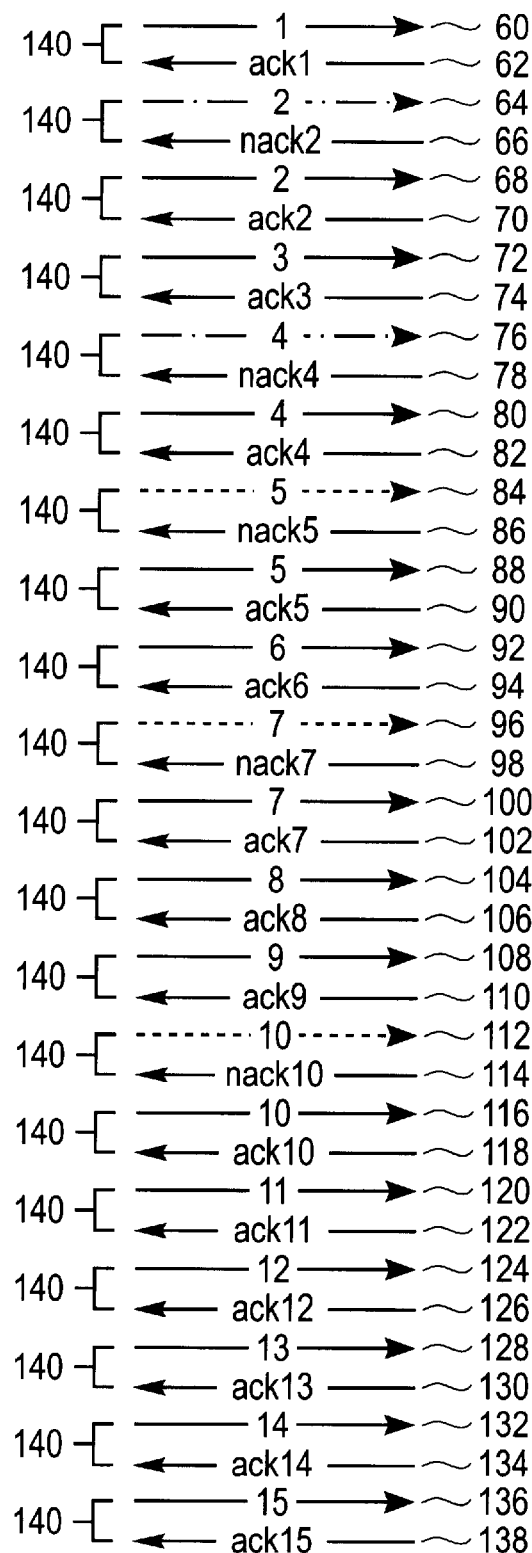
FIG. 2 is an exemplary traffic scenario using a wait and see protocol, where there are transmission errors.
Figure 3:
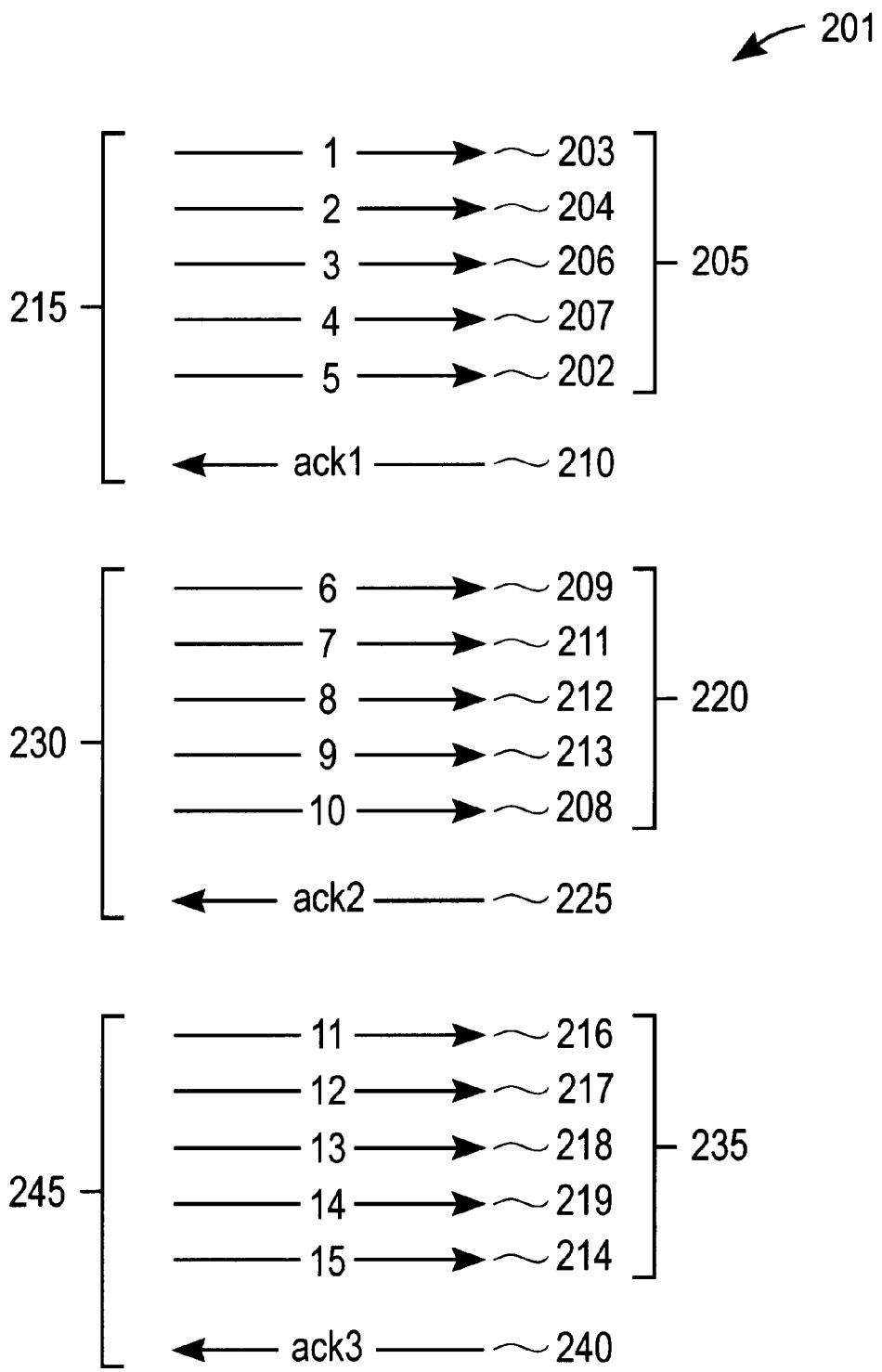
FIG. 3 is an exemplary traffic scenario using a window protocol, where there are no errors in transmission.
Figure 4:
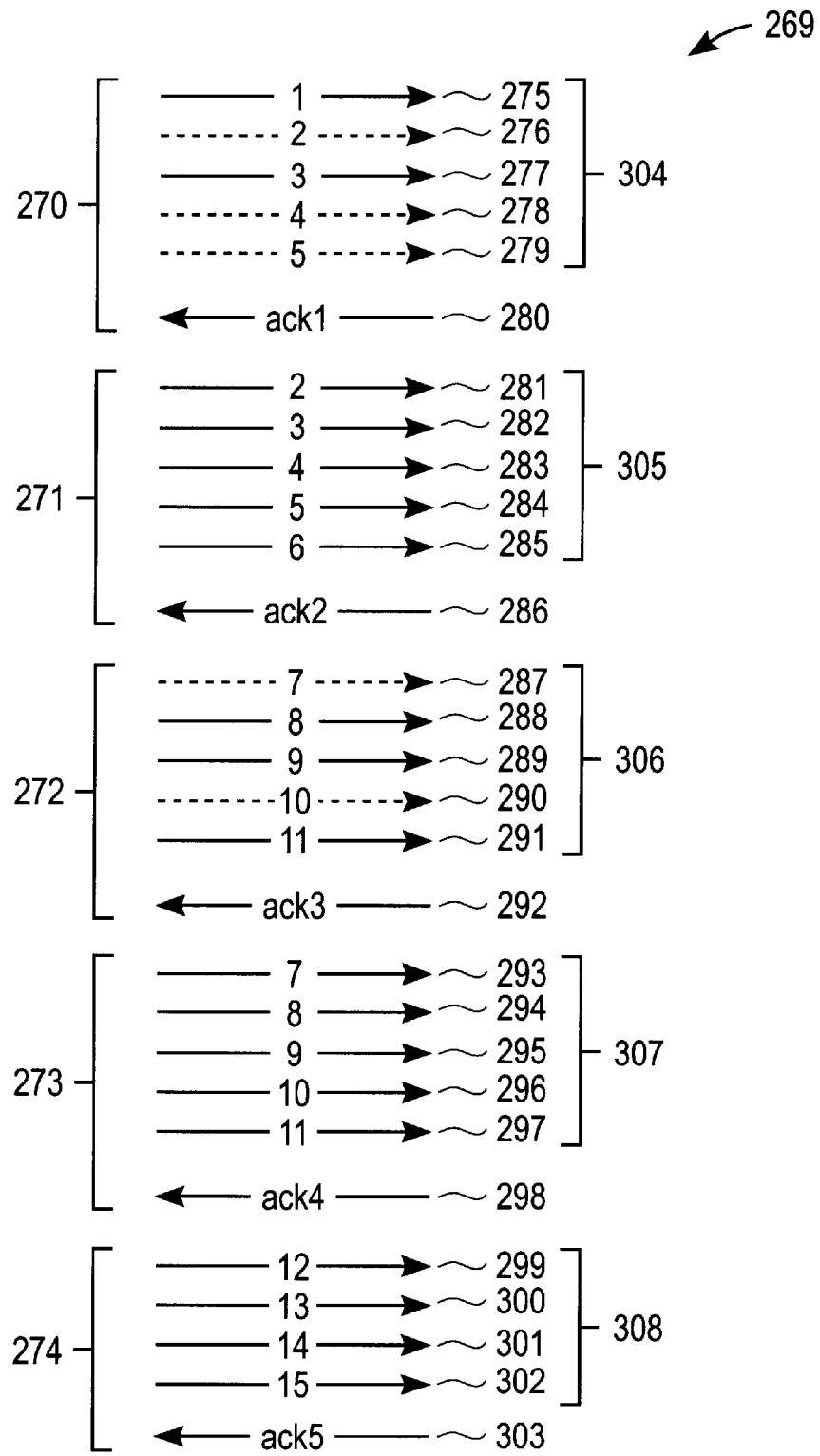
FIG. 4 is an exemplary traffic scenario using a window protocol, with no acknowledgement indicating errors, where there are transmission errors.
Figure 5:
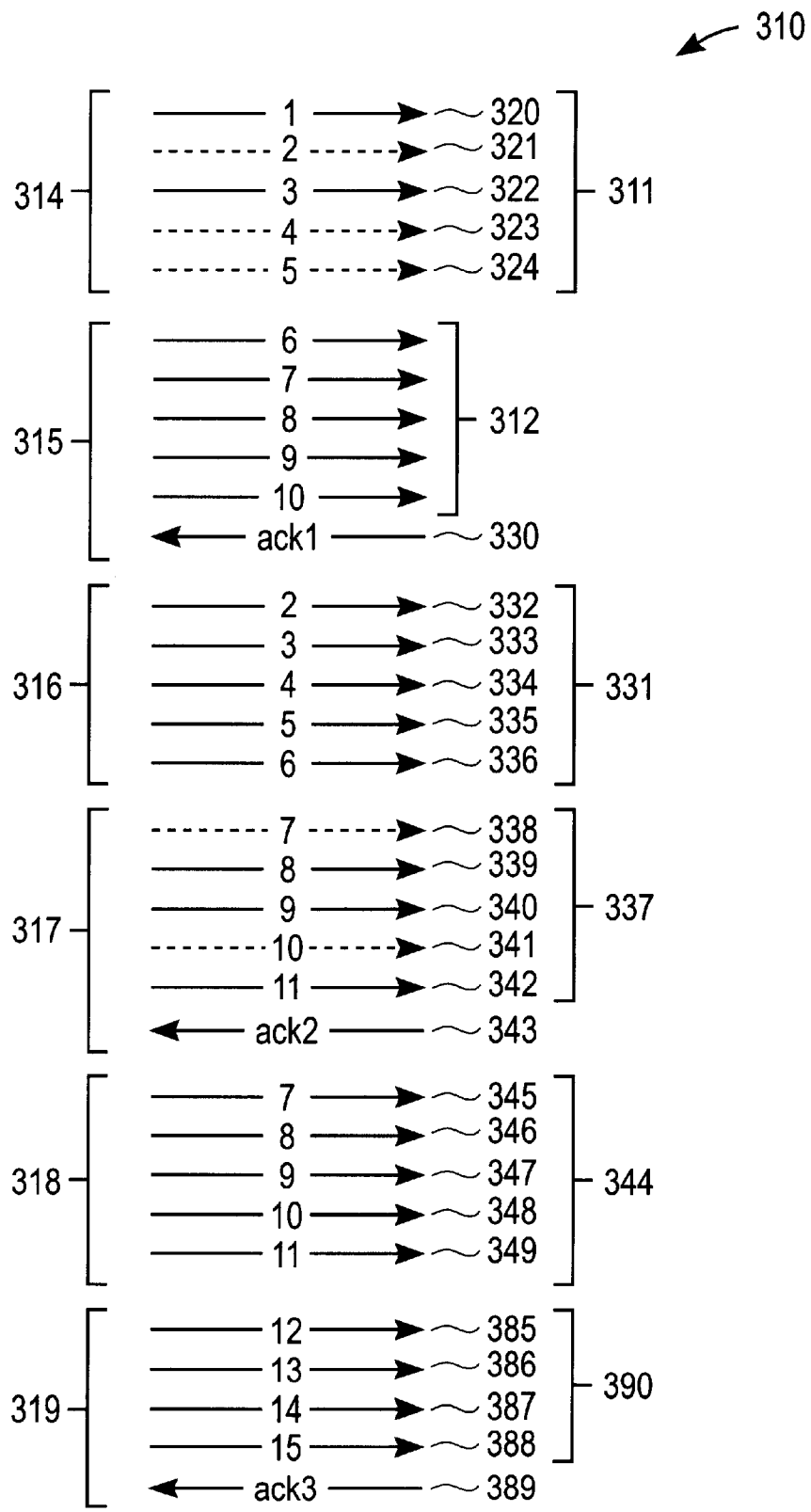
FIG. 5 is another exemplary traffic scenario using a window protocol, with no acknowledgement indicating errors, where there are transmission errors.
Figure 6:
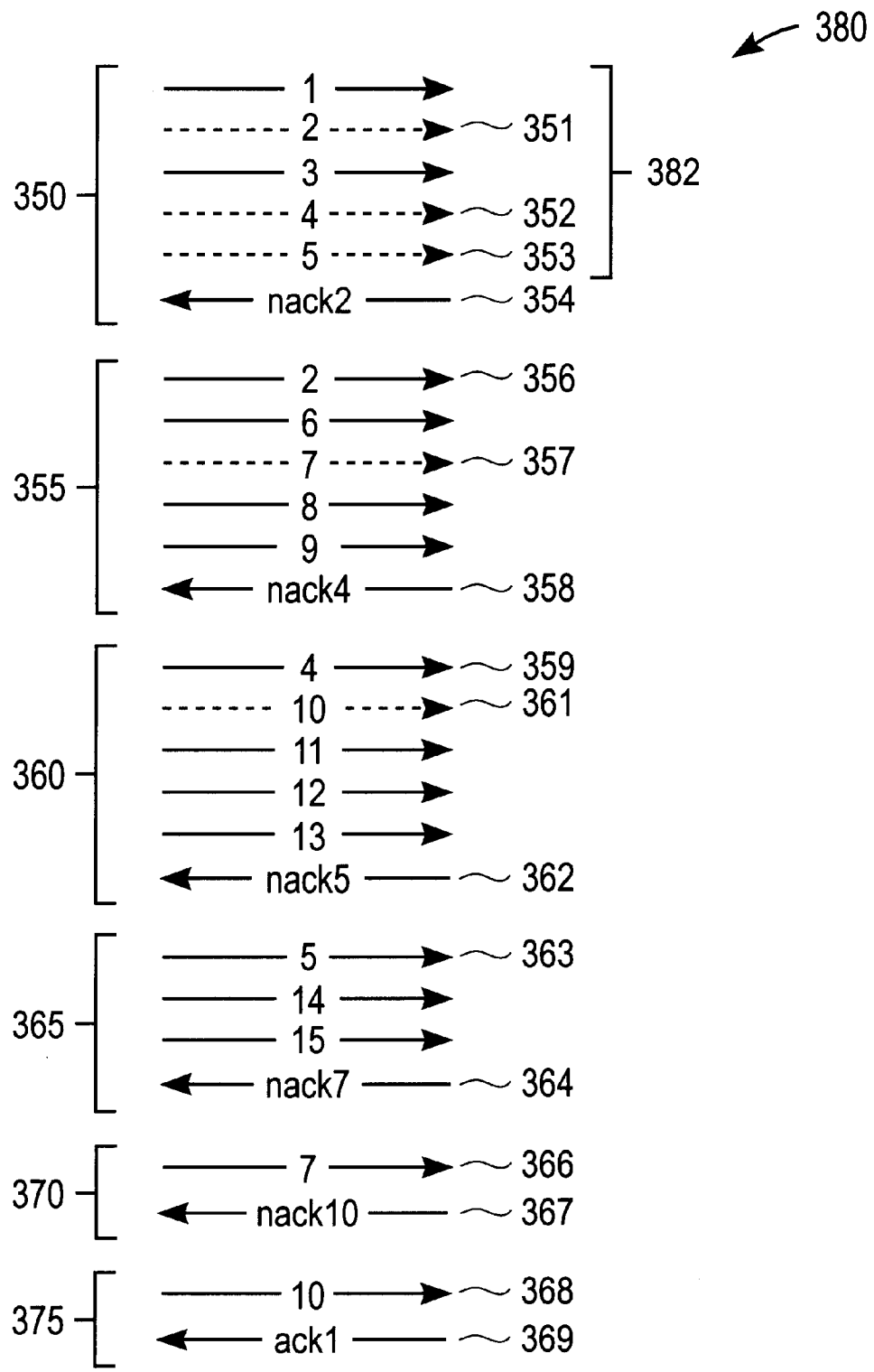
FIG. 6 is an exemplary traffic scenario using a window protocol with a selective reject mechanism, where there are transmission errors.

In the following description, for purposes of explanation, numerous specific details are set forth in order to provide a thorough understanding of the invention. It will be apparent, however, to one skilled in the art, that the invention may be practiced without these specific details. In other instances, well-known structures, devices or protocols are shown in block diagram form to avoid unnecessarily obscuring the invention.

In a presently preferred embodiment, allocation of physical, over-the-air, i.e., radio, or wireless, resources to a packet data user of a wireless communication system is asymmetric. As an example, in one embodiment, five time slots of a time frame are allocated to carry frames of packet data in the forward, i.e., transmission, direction. Further, at least one timeslot of each time frame in which the packet data is transmitted is allocated in the return direction, to transmit acknowledgments of the packet data frames. In a presently preferred embodiment, one time slot per time frame is allocated in the return direction for each packet data transmission, regardless of the number of time slots allocated in the forward direction.

In a presently preferred embodiment, the window size, i.e., the number of messages transmitted as a group, or, more specifically, the number of frames of data, or data segments, or data messages, of packet data transmitted in a time frame, is determined during the execution of a resource allocation procedure, before data transmission. In a presently preferred embodiment, the maximum transmit window size for the packet data is negotiated for, and defined, during the processing of a transmission resource allocation procedure, and resources for the acknowledgments are allocated to cater to the determined window size. For example, if a maximum window size of five is defined, the receiving entity will acknowledge the data segment transmissions in groups of five; i.e., the receiving entity will transmit an aggregated acknowledgment message for the possible transmission of every five data segment transmissions. In this example, at least one-fifth of the resource allocated for the packet transmission direction must be allocated to the aggregated acknowledgement direction.

In a presently preferred embodiment, packet data can potentially be as long as fifteen hundred (1500) bytes, and is, therefore, segmented into smaller units, called frames or data segments. In a presently preferred embodiment, each frame, or data segment, of packet data (or just "packet") is nineteen octets, or bytes, or one hundred and fifty-two (152) bits, long. Thus, a packet of fifteen hundred bytes is segmented into seventy-nine (79) data segments.

In a presently preferred embodiment, each data segment has a sequence number associated with it, to allow for correct re-assembly of the packet at a receiving end. Among other benefits, this allows for data segments to be transmitted out of order.

In a presently preferred embodiment, an aggregated acknowledgement message ("AACK message") is transmitted by the receiving end of a wireless transmission path. The AACK message contains a bit map which identifies all the data segments of the packet data which have been successfully transmitted up to when the AACK message is sent, including data segments that have been previously acknowledged. The AACK message also, by default, identifies the data segments that have been unsuccessfully transmitted up to when the AACK message is sent. This format allows multiple data segments to be acknowledged ("Acked"), or negative acknowledged ("Nacked"), together. As in the presently preferred embodiment there is a maximum of seventy-nine data segments per packet, the AACK message has seventy-nine bits to status all possible data segments in one packet.

Figure 7:
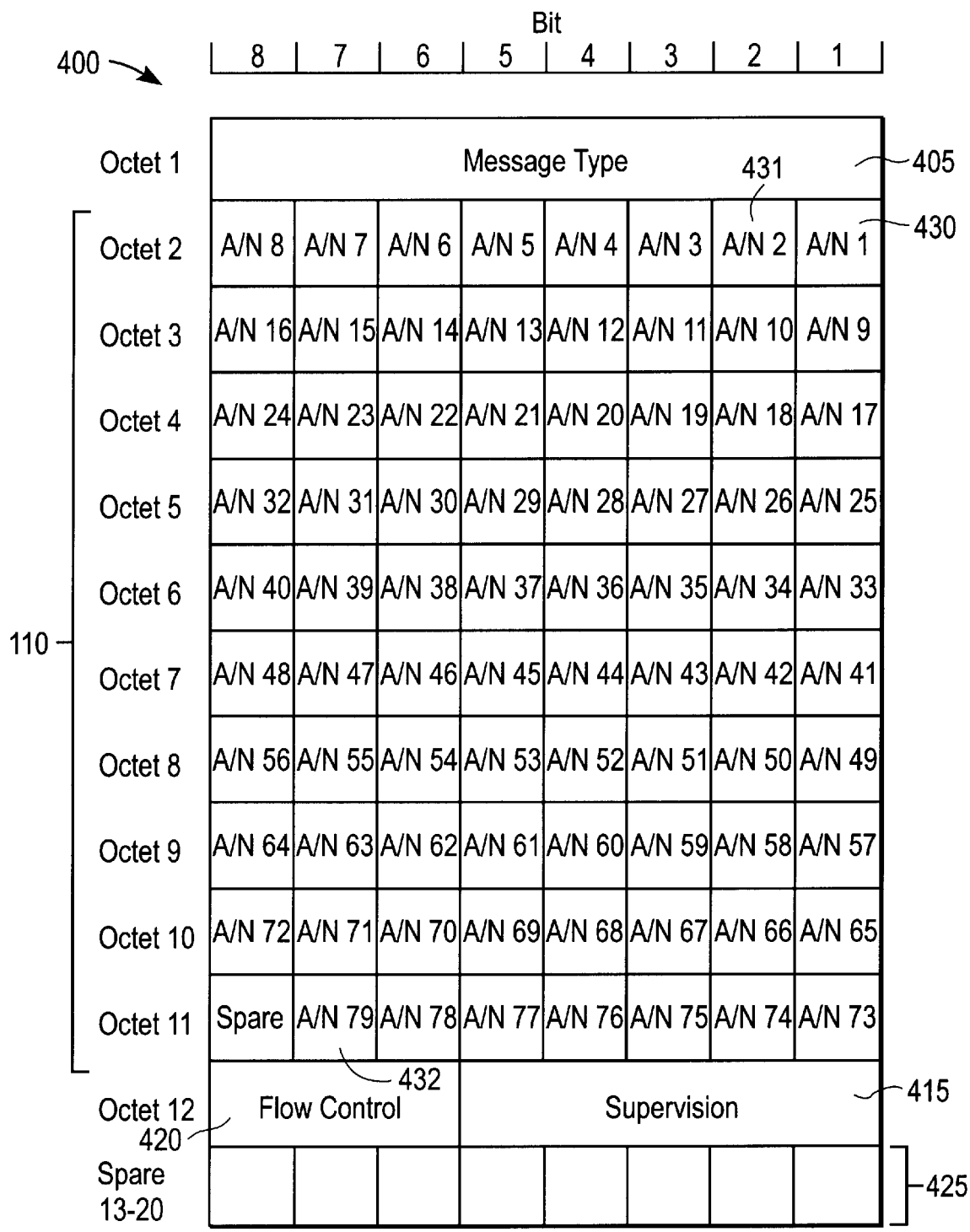
FIG. 7 is an embodiment of an aggregated acknowledge message.

Referring to FIG. 7, a presently preferred embodiment of an AACK message 400 is depicted, wherein the AACK message 400 is twenty octets, or bytes, in length. The first octet 405 of the AACK message 400 is an eight-bit field for the message type, or identification. The message type field of the AACK message 400 indicates that the message is an AACK message. The next ten octets 410 of the AACK message 400 contain a bit map which contains an A/N bit for each of a possible seventy-nine data segments, with bit eight of octet eleven being a spare, unused bit. The location of an A/N bit within the bit map is indicative of the sequence number of the respective data segment of the packet which the bit is used to acknowledge as successfully received.

Thus, for example, A/N bit 430, which is the first A/N bit in the bit map of the AACK message 400, is the A/N bit for acknowledging the successful transmission of the first data segment of a packet. A/N bit 431, which is the second A/N bit in the bit map of the AACK message 400, is the A/N bit for acknowledging the successful transmission of a second data segment of the packet, and so on. A/N bit 432, which is the seventy-ninth, and final, A/N bit in the bit map of the AACK message 400, is the A/N bit for acknowledging the successful transmission of a seventy-ninth data segment of a packet. Thus, the AACK message 400 is formatted such that a maximum of seventy-nine possible outstanding data segments of a packet can be acknowledged with a single message. The AACK message 400 format, therefore, provides for all potential segments of a fifteen hundred (1500) byte packet to be acknowledged with one AACK message.

In a presently preferred embodiment, each A/N bit is set to a value of zero if a corresponding numbered data segment has not be transmitted or has been transmitted in error. Each A/N bit is set to a value of one if the corresponding numbered data segment has been transmitted, and received, error free.

In an alternative embodiment, each A/N bit is set to a value of one if a corresponding numbered data segment has not been transmitted or has been transmitted in error. In this alternative embodiment, each A/N bit is set to a value of zero if the corresponding numbered data segment has been transmitted, and received, error free.

A Supervision field 415 is stored in bits one through five of the twelfth octet of the AACK message 400. Supervision procedures, and the corresponding Supervision field 415, are generally used to control abnormal link conditions between a transmitting and a receiving entity.

A Flow Control field 420 is stored in bits six through eight of the twelfth octet of the AACK message 400. Flow control procedures, and the corresponding Flow Control field 420, are generally used to monitor and control the transmit window size.

Spare bits 425 comprise octets thirteen through twenty of the AACK message 400. In an embodiment, additional error detection CRC is implemented in one or more of the spare bits 425, to reduce the chance of undetected errors in the AACK message 400.

Generally, at the time an AACK message 400 is composed for transmission, all data segments of a packet that have been correctly received are acknowledged by the receiving end, or entity. In a presently preferred embodiment, this is done by setting the A/N bit in the AACK message 400 corresponding to the sequence number of each successfully transmitted data segment of a packet to a value of one.

When the AACK message 400 is received by the entity transmitting the packet, all successfully acknowledged data segments can be discarded, or otherwise ignored.

The entity transmitting the packet, under certain circumstances, can be triggered to retransmit one or more data segments, or frames, of a packet data. It is envisioned that three such events may trigger retransmissions.

An AACK message is generally transmitted to acknowledge one or more transmitted data segments. In some circumstances, an AACK message is transmitted with an acknowledgement for one or more out of sequence data segments. For example, data segment number ten may be acknowledged while data segment number nine is not.

In a first, presently preferred embodiment, event, if a data segment, or frame, is acknowledged out of turn, the unacknowledged data segment(s), or frames, are retransmitted once all the data segments of a data packet are transmitted at least once, in sequential order. For example, an exemplary data packet has fifteen frames and frame number ten is acknowledged before frame number nine. Frames eleven through fifteen are transmitted after frame ten is acknowledged. Then, frame nine is retransmitted.

In this first embodiment event, the receipt of an aggregated acknowledgement of data frame nine does not trigger retransmission of data frames ten or eleven through fifteen. This is because the successful transmissions of data frames ten through fifteen have already been previously acknowledged; the respective bits in the aggregated acknowledge messages have been set, and remain set, to indicate these frames' successful receipt by the receiving entity.

In a second event, if a data segment, or frame, is acknowledged out of turn, the unacknowledged data segment(s), or frames, are retransmitted in the time frame following the time frame in which the transmitting entity receives the aggregated acknowledgement indicating one or more data segments were not transmitted correctly. For example, an exemplary data packet has fifteen frames and frame number ten is acknowledged before frame number nine. Upon receiving the aggregated acknowledgement indicating frame ten was successfully received, and also indicating frame nine was not successfully received, the transmitting entity retransmits frame nine in the following time frame.

In this embodiment, the subsequent receipt of an aggregated acknowledgement of data frame nine does not trigger retransmission of data frame ten. This is because the successful transmission of data frame ten has already been previously acknowledged; its respective bit in the aggregated acknowledge messages have been set, and remains set, to indicate its successful receipt by the receiving entity.

In a third event, when a data segment, or frame, is first transmitted, a respective timer is set in the transmitting entity. In this embodiment, if the data segment is unacknowledged when the timer expires, i.e., the transmitting entity does not receive an aggregated acknowledgement acknowledging the data segment before its respective timer expires, the transmitting entity retransmits the data segment. In this embodiment, as with the others, the aggregated acknowledgement message acknowledging the retransmitted data segment does not trigger retransmission of data segments that have been successfully transmitted, and received.

In a presently preferred embodiment of this third event, the data segment, or frame, associated with the timer expiry, i.e., the data segment whose respective timer expired before an acknowledgment of its transmission is received by the transmitting entity, is retransmitted once all the data segments of the respective data packet are transmitted at least once, in sequential order. In an alternative embodiment, the data segment, or frame, associated with the timer expiry is retransmitted in the time frame following the time frame in which its respective timer expires.

Figure 8:
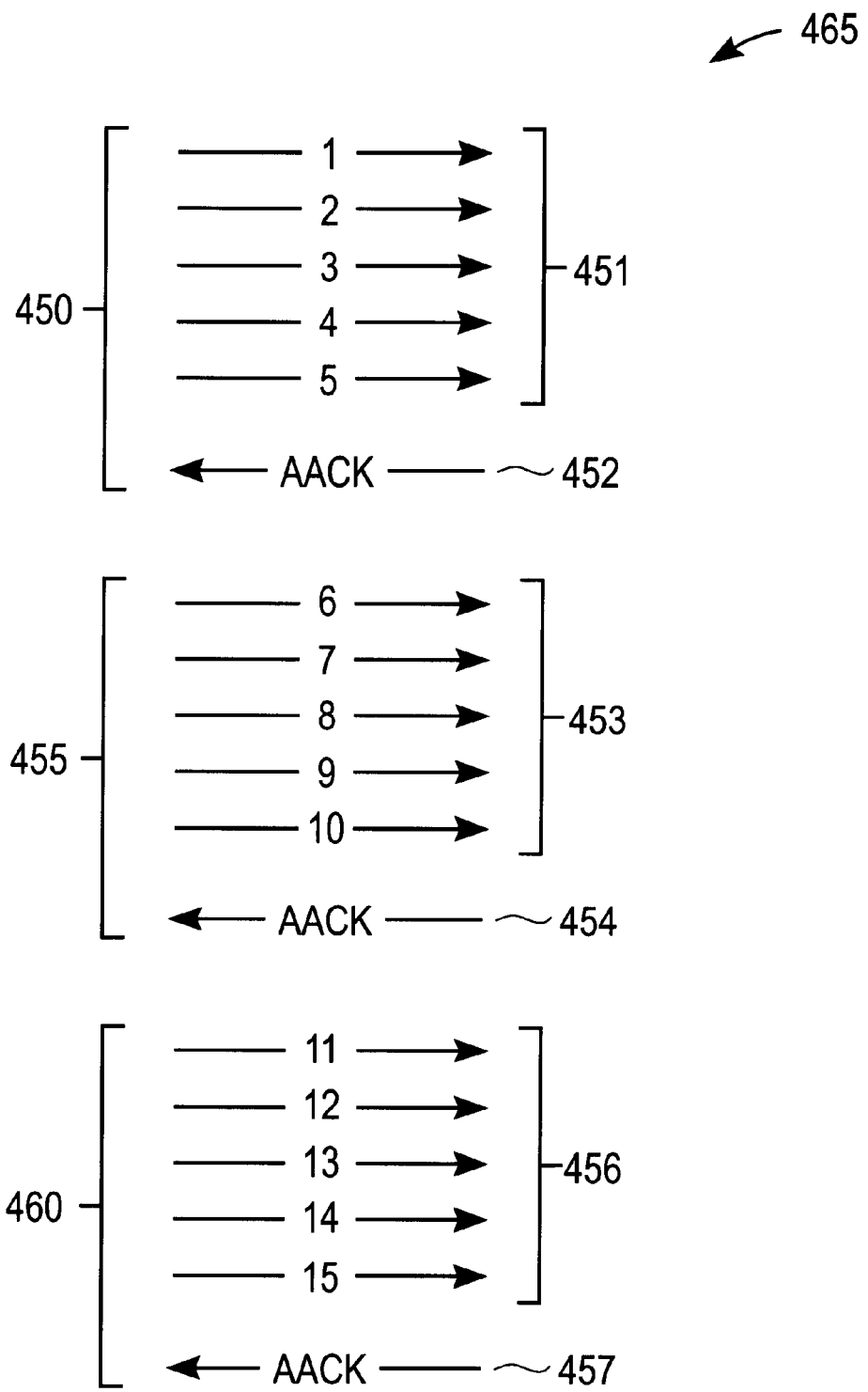
FIG. 8 is an exemplary traffic scenario using an aggregated acknowledge message mechanism for error control, where there are no errors in transmission.

In FIG. 8, an exemplary packet transmission scenario 465 of a packet of 2129–2280 bits is depicted. In scenario 465, every data segment transmission is successfully transmitted, and received, on a first transmission attempt. As previously indicated, in a presently preferred embodiment, each data segment contains a maximum of nineteen octets of data, or one hundred and fifty-two (152) bits. Thus, a packet of between 2129 and 2280 bits requires fifteen data segments to transmit completely. In exemplary transmission scenario 465, five data segments are transmitted per time frame, and one AACK message is also transmitted per time frame. Thus, the entity transmitting the packet uses five time slots per time frame and the receiving entity uses one time slot per time frame.

In scenario 465, a first group of five data segments 451 is successfully transmitted in a first time frame 450. This first group 451 contains data segments with sequence numbers one through five. The receiving entity, after receiving the five data segments 451, transmits an AACK message 452, indicating that all of them were successfully transmitted.

The AACK message 452, generally depicted in FIG. 9A, has the first five bits of its bit map 485 set to a value of one. Specifically, bits one through five of the second octet 480 of AACK message 452 are each set to a value of one, indicating that data segments one through five respectively were successfully transmitted.

Referring again to FIG. 8, in time frame 455 of scenario 465, a second group of five data segments 453 is successfully transmitted. This second group 453 contains data segments with sequence numbers six through ten. The receiving entity, after receiving the five data segments 453, transmits an AACK message 454, indicating that all of them were successfully transmitted.

The AACK message 454, generally depicted in FIG. 9B, has the first ten bits of its bit map 486 set to a value of one. Specifically, bits six through eight of the second octet 481 and bits one and two of the third octet 482 of AACK message 454 are each set to a value of one, indicating that data segments six through ten respectively were successfully transmitted. Further, bits one through five of the second octet 481 are also each set to a value of one, as a continuing indication that data segments one through five, which were previously transmitted, were also successfully transmitted.

Referring once again to FIG. 8, in time frame 460 of scenario 465, the third, and final, group of five data segments 456 is successfully transmitted. This last group 456 contains data segments with sequence numbers eleven through fifteen. The receiving entity, after receiving the five data segments 456, transmits an AACK message 457, indicating that all of them were successfully transmitted.

Figure 9C:
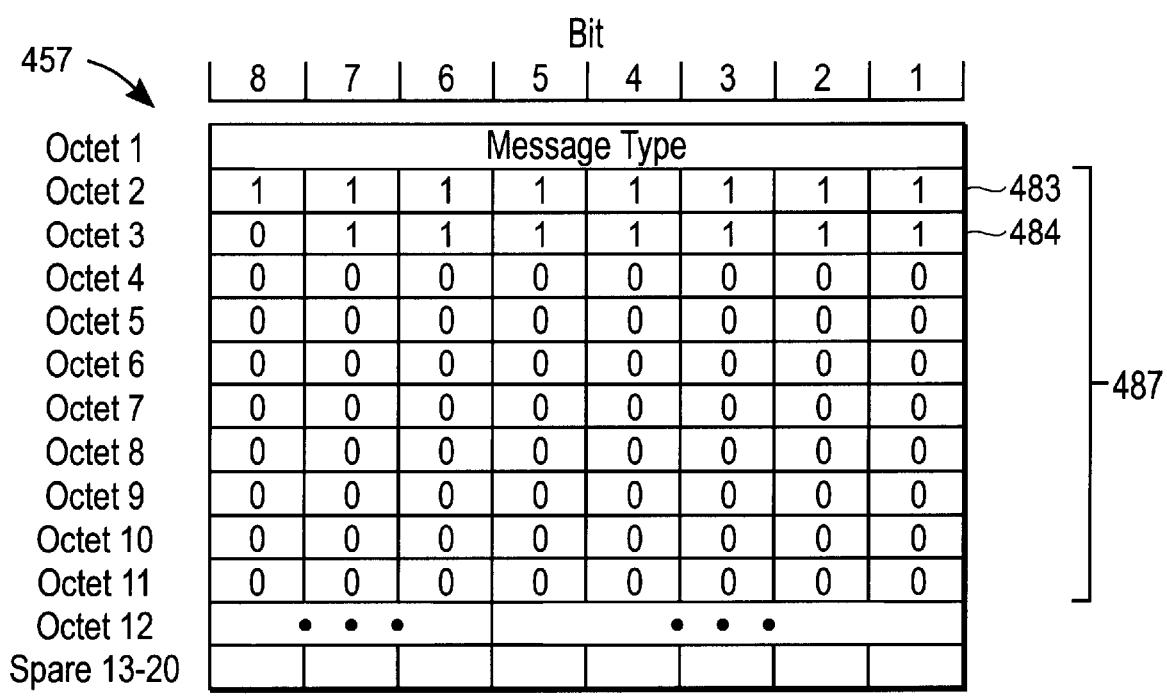

The AACK message 457, generally depicted in FIG. 9C, has the first fifteen bits of its bit map 487 set to a value of one. Specifically, bits three through seven of the third octet 484 of AACK message 457 are each set to a value of one, indicating that data segments eleven through fifteen respectively were successfully transmitted. Further, bits one through eight of the second octet 483 and bits one and two of the third octet 484 are also each set to a value of one, as a continuing indication that data segments one through ten, which were previously transmitted, were also successfully transmitted.

In a presently preferred embodiment, the receiving entity transmits an AACK message whenever it receives the final data segment of a packet. In a presently preferred embodiment, the receiving entity knows that it has received the final data segment of a packet by use of a bit in the data segment messages. A single bit (a "More bit") of each data segment of a packet is implemented to indicate whether or not there are more data segments of the packet to be transmitted. In a presently preferred embodiment, the More bit is set to a value of one if there are more data segments in the packet to be transmitted, and set to a value of zero if the More bit is in the last data segment of the packet. In an alternative embodiment, the More bit of a data segment is set to a value of zero if there are more data segments in the packet to be transmitted, and set to a value of one if the More bit is in the last data segment of the packet.

Additionally, other alternative schemes for indicating the total number of data segments in a packet may be implemented. For example, the number of data segments in the packet to be transmitted may be indicated during the processing of a transmission resource allocation procedure, when resources, such as, e.g., time slots, are allocated to establish a transmission link between a transmitting and a receiving entity. In this scheme, the number of data segments is forwarded from the transmitting entity to the receiving entity as part of the resource allocation procedure. As a further example, the number of data segments in the packet to be transmitted may be included as a field in the first data segment transmitted, or in each data segment transmitted.

Figure 10:
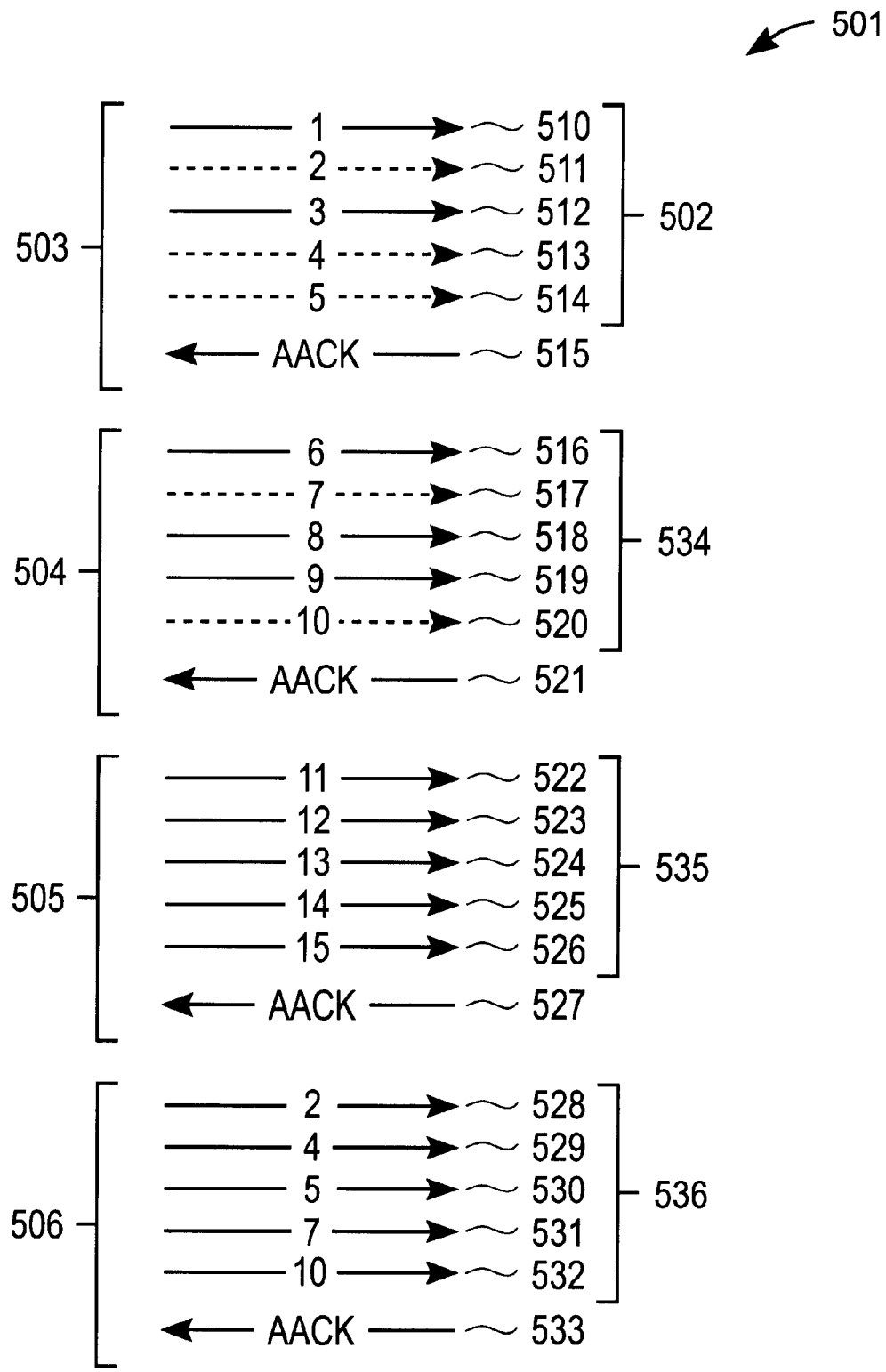
FIG. 10 is an exemplary traffic scenario using an aggregated acknowledge message mechanism for error control, where there are transmission errors.

In FIG. 10, an exemplary packet transmission scenario 501 of a packet of 2129–2280 bits is depicted. In scenario 501, various data segments are unsuccessfully transmitted on the first attempt. As previously indicated, in a presently preferred embodiment, each data segment comprises a maximum of one hundred and fifty two (152) bits of data, and, therefore, a packet of between 2129 and 2280 bits requires fifteen data segments to transmit completely. In scenario 501, five data segments are transmitted per time frame, and one AACK message is also transmitted per time frame.

In scenario 501, a first group of five data segments 502 is transmitted in a first time frame 503. This first group 502 contains data segments with sequence numbers one through five. In this first group 502, however, the second data segment 511, the fourth data segment 513 and the fifth data segment 514 are each unsuccessfully transmitted.

The receiving entity, in the appropriate time slot, and after successfully receiving the first data segment 510 and the third data segment 512, transmits an AACK message 515, indicating that data segments 510 and 512 were successfully transmitted. The AACK message 515, generally depicted in FIG. 11A, has the first A/N bit 550 and the third A/N bit 551 of its bit map 590 set to a value of one. Specifically, bits one and three of the second octet 556 of AACK message 515 are each set to a value of one, indicating that data segments one and three respectively were successfully transmitted. No other A/N bits in AACK message 515 are set to a value of one as the receiving entity did not successfully receive any other data segments in the packet. Thus, bits 552, 553 and 554 of AACK message 515 are set to a value of zero, as the receiving entity did not successfully receive the second, forth and fifth data segments of the packet, even though the transmitting entity transmitted them.

Referring again to FIG. 10, in a second time frame 504, the transmitting entity transmits a second group 534 of five data segments. The second group 534 comprises data segments with sequence numbers six through ten. In this second group 534, the seventh data frame 517 and the tenth data frame 520 are both unsuccessfully transmitted; the sixth data frame 516, the eighth data frame 518 and the ninth data frame 519 are, however, successfully transmitted at this time.

The receiving entity, in the appropriate time slot, and after successfully receiving the sixth data segment 516, the eighth data segment 518 and the ninth data segment 519, transmits an AACK message 521, indicating that data segments 516, 518 and 519 were successfully transmitted. The AACK message 521, generally depicted in FIG. 11B, has the sixth, eighth and ninth A/N bits of its bit map 595 set to a value of one. Specifically, bits six and eight of the second octet 555 and bit one of the third octet 557 of AACK message 521 are each set to a value of one, indicating that data segments six, eight and nine respectively were successfully transmitted. Further, bits one and three of the second octet 555 are also each set to a value of one, as a continuing indication that data segments one and three, which were previously transmitted, were also successfully transmitted.

No other A/N bits in AACK message 521 are set to a value of one as the receiving entity did not successfully receive any other data segments in the packet. Thus, bits two, four, five and seven of the second octet 555 and bit two of the third octet 557 remain set to zero, as the receiving entity did not successfully receive the second, fourth, fifth, seventh or tenth data segments of the packet at this time, even though the transmitting entity transmitted them.

Referring again to FIG. 10, in a third time frame 505, the transmitting entity transmits a third group 535 of five data segments. The third group 535 comprises data segments with sequence numbers eleven through fifteen. In this third group 535, all the data segments eleven through fifteen are successfully transmitted at this time.

The receiving entity, in the appropriate time slot, and after successfully receiving the eleventh through fifteenth data segments, 522–526 respectively, transmits an AACK message 527, indicating that data segments 522 through 526 were successfully transmitted. The AACK message 527, generally depicted in FIG. 11C, has the eleventh, twelfth, thirteenth, fourteenth and fifteenth A/N bits of its bit map 600 set to a value of one. Specifically, bits three through seven of the third octet 563 of AACK message 527 are each set to a value of one, indicating that data segments eleven through fifteen respectively were successfully transmitted. Further, bits one, three, six and eight of the second octet 562 and bit one of the third octet 563 are also each set to a value of one, as a continuing indication that data segments one, three, six, eight and nine, which were previously transmitted, were also successfully transmitted.

No other A/N bits in AACK message 527 are set to a value of one as the receiving entity did not successfully receive any other data segments in the packet. Thus, bits two, four, five and seven of the second octet 562 and bit two of the third octet 563 remain set to zero, as the receiving entity did not successfully receive the second, fourth, fifth, seventh or tenth data segments of the packet at this time, even though the transmitting entity previously transmitted them.

The transmitting entity has now transmitted every data segment in the fifteen data segment packet once. However, data segments two, four, five, seven and ten have not been successfully transmitted to, or received by, the receiving entity. The transmitting entity is made aware that these data segments have not been successfully transmitted by the AACK messages, 515, 521 and 527 that it has received from the receiving entity. Thus, at this time, the transmitting entity begins retransmitting the data segments that were previously transmitted in error. In a presently preferred embodiment, the transmitting entity retransmits the data segments in sequential order. In an alternative embodiment, the transmitting entity retransmits the data segments in reverse sequential order. In yet another alternative embodiment, the transmitting entity retransmits the data segments in a generally random order.

Referring again to FIG. 10, in a fourth time frame 506, the transmitting entity transmits a fourth group 536 of five data segments. The fourth group 536 comprises data segments with sequence numbers two, four, five, seven and ten; i.e., all of the data segments that were previously unsuccessfully transmitted. In this fourth group 536, all the data segments are successfully transmitted at this time.

The receiving entity, in the appropriate time slot, and after successfully receiving the second, fourth, fifth, seventh and tenth data segments, 528–532 respectively, transmits an AACK message 533, indicating that data segments 528 through 532 were successfully transmitted. The AACK message 533, generally depicted in FIG. 11D, has the second, fourth, fifth, seventh and tenth A/N bits of its bit map 605 set to a value of one. Specifically, bits two, four, five and seven of the second octet 580 and bit two of the third octet 581 of AACK message 533 are each set to a value of one, indicating that data segments two, four, five, seven and ten respectively were successfully transmitted. Further, bits one, three, six and eight of the second octet 580 and bits one and three through seven of the third octet 581 are also each set to a value of one, as a continuing indication that data segments one, three, six, eight, nine, and eleven through fifteen, which were previously transmitted, were also successfully transmitted.

No other A/N bits in the bit map 605 of AACK message 533 are set to a value of one as the transmitting entity did not transmit any other data segments. Thus, by the end of the fourth time frame 506, the packet has been successfully transmitted by the transmitting entity and acknowledged by the receiving entity.

Figure 12:
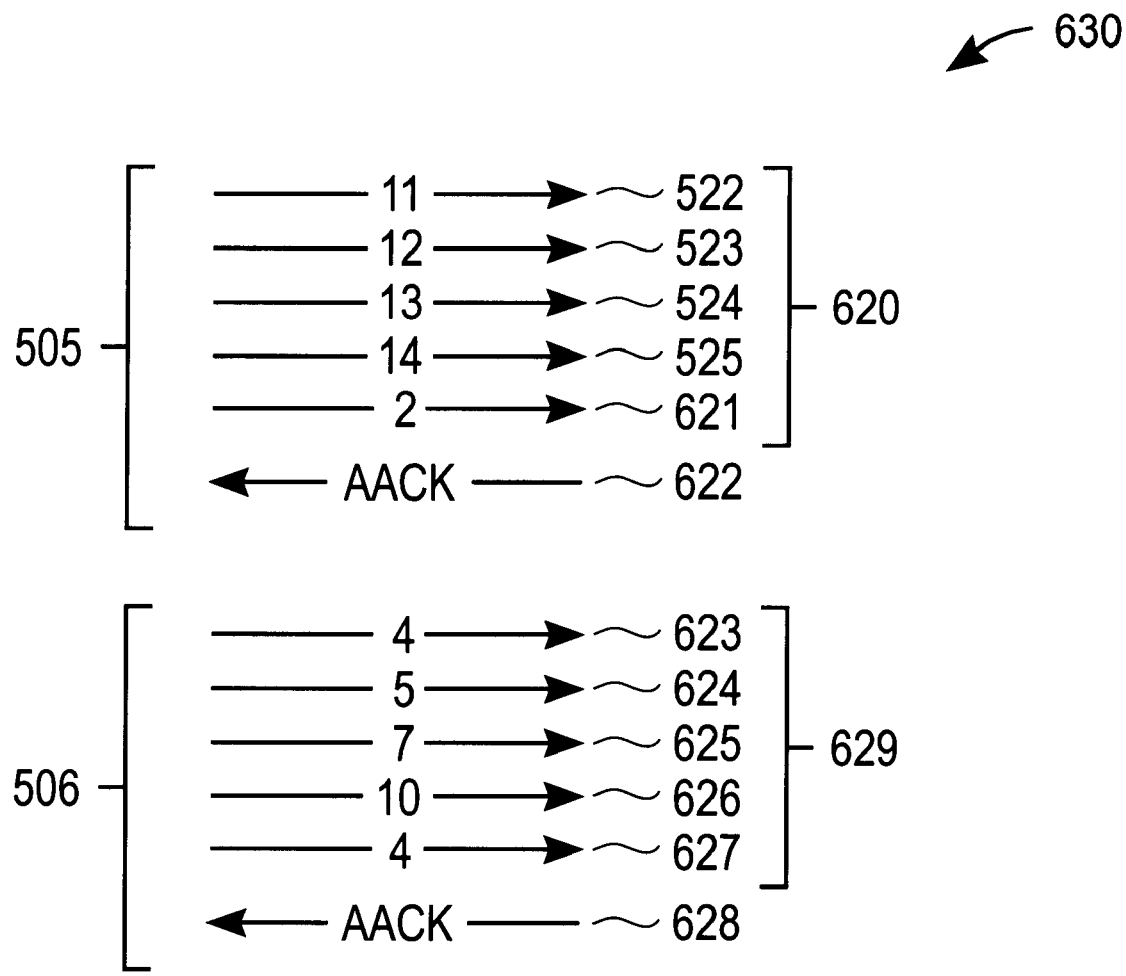
FIG. 12 is an a second exemplary traffic scenario using an aggregated acknowledge mechanism for error control, where there are transmission errors.

In scenario 501, if there were only fourteen data segments, for example, comprising the packet to be transmitted, then in time frame 505, only four data segments would be required to be transmitted for the first time, i.e., data segments eleven through fourteen. As in scenario 501 five data segments are sent per time frame, this would leave one time slot available for the beginning of any necessary retransmissions. In a presently preferred embodiment and in exemplary scenario 501, in this situation, the transmitting entity transmits the second data segment as part of the third group of data segments. Referring to FIG. 12, in time frame 505, a third group 620 of five data segments comprise data segments eleven through fourteen, 522–525 respectively, and the retransmission of the second data segment 621.

In scenario 630, all five data segments in group 620 are successfully transmitted. Thus, the receiving entity transmits an AACK message 622 to the transmitting entity, indicating that data segments two and eleven through fourteen have been successfully transmitted. In scenario 630, which is identical to scenario 501 of FIG. 10 until the third time frame 505, the AACK message 622 also indicates the prior successful transmission of data segments one, three, six, eight and nine.

In scenario 630, in a fourth time frame 506, the transmitting entity retransmits data segments four 623, five 624, seven 625 and ten 626. As in scenario 630 five data segments are sent per time frame, this leaves one time slot available for a data segment transmission. In a presently preferred embodiment, in this situation, the transmitting entity retransmits one of the four data segments, i.e., one of data segments four, five, seven and ten, a second time in time frame 506. In this manner, there is an increased chance of the doubly-transmitted data segment being successfully received by the receiving entity.

In a presently preferred embodiment, the transmitting entity retransmits the lowest sequentially numbered data segment twice, e.g., for example, in scenario 630, data segment four 627 is retransmitted twice. In an alternative embodiment, the transmitting entity retransmits the highest sequentially numbered data segment twice, e.g., for example, in scenario 630 data segment ten would be transmitted twice in group 629. In yet another alternative embodiment, the transmitting entity retransmits a generally random data segment that requires retransmission twice, e.g., for example, in scenario 630 any of data segments four, five, seven or ten could be retransmitted twice in group 629.

In a presently preferred embodiment, if one or more data segments have been unsuccessfully retransmitted two or more times, the data segment(s) with the highest retransmission failure rate is retransmitted in the extra transmission time slot(s) of a time frame.

In a presently preferred embodiment, if more than one time slot is available in a time frame for the retransmission of data segments after all data segments to be retransmitted have been accommodated for in the time frame, one or more of the data segments to be retransmitted is retransmitted more than once. For example, in scenario 630, if only data segment four required retransmission in time frame 506, then data segment four would be transmitted five times, in each of the five available time slots, in time frame 506.

As another example, in scenario 630 if only data segments four and five required retransmission in time frame 506, then data segment four may be transmitted in three time slots and data segment five may be transmitted in two time slots of time frame 506. Alternatively, in this scenario of only data segments four and five requiring retransmission in time frame 506 of scenario 630, data segment four may be transmitted two times and data segment five may be transmitted three times in time frame 506. Other various permutations of the transmission schedules for data segments four and five are also conceivable, and remain within the scope of the inventions herein.

In another embodiment, the frequency of the AACK message transmissions is determined as part of a transmission resource allocation procedure. For example, an AACK message may be sent every second time frame, or every fourth time frame. In this embodiment, the number of new acknowledgements of data segment transmissions in each AACK message is determined by the window size of the packet transmission and the frequency of the AACK message transmission.

Figure 13:
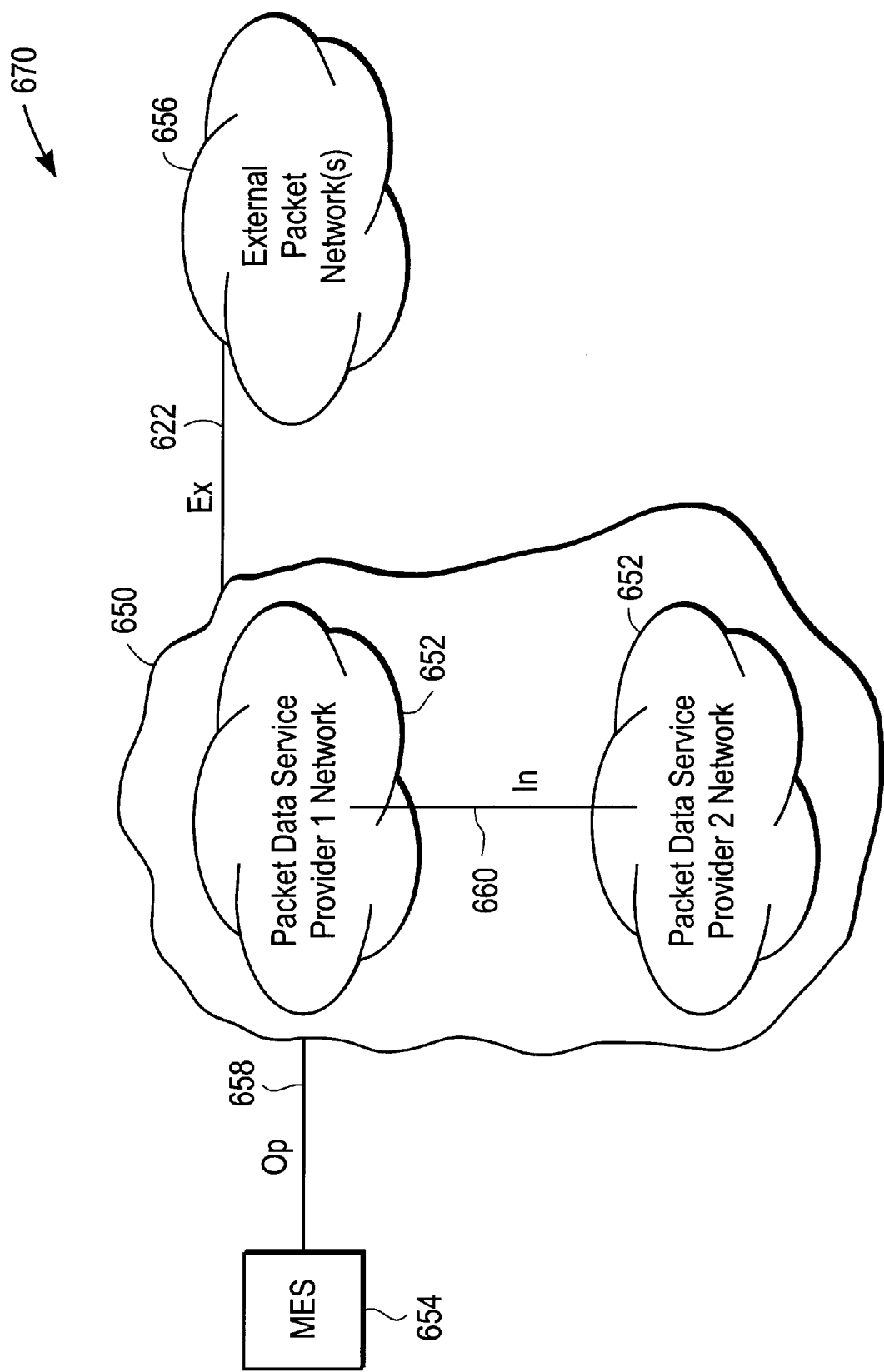
FIG. 13 illustrates a general embodiment of a packet data services network.

In a presently preferred embodiment, the aggregated acknowledgement mechanism is used in a wireless network, or system. In a presently preferred embodiment of a wireless network 670, as shown in FIG. 13, a packet data services network 650 is a wireless and mobile extension of known data networks. Packet data services network 650 provides seamless access capability to applications that are generally provided over wireline data networks.

A packet data services network 650 is a collection of packet data service provider networks 652. The packet data service provider networks 652 are connected to each other via an internal network interface 660.

In a presently preferred embodiment, each packet data service provider network 652 has a base station subsystem ("BSS") and a network switching subsystem ("NSS"). In general, a BSS provides wireless transmission capabilities and access. In a presently preferred embodiment, a BSS has one or more base transceiver stations ("BTS"s) and a base station controller ("BSC"). In an alternative embodiment, a BSS may have more than one BSC. A BTS is responsible for managing the over-the-air resources between an end user of the wireless network 670 and a packet data service provider network 652. Thus, a BTS is responsible for the physical communication link for end users to gain access to the wireless network 670.

In general, an NSS of a packet data service provider network 652 is a collection of network elements that provides switching and interconnectivity support for the wireless network 670.

In a presently preferred embodiment, the packet data services network 650 is connected, via an external network interface 662, to one or more external packet data networks 656. The external packet data networks 656 are networks that are external to the packet data services network 650. An example of an external packet data network 656 is the Internet. In a presently preferred embodiment, the external network interface 662 is a landline interface, and thus, provides a wireline interface between the packet data services network 650 and an external packet data network 656.

One or more mobile end stations 654 communicate with the packet data services network 650. A mobile end station ("MES") 654 is generally an end user of the wireless network system 670. In a presently preferred embodiment, an MES is a terminal unit. In an alternative embodiment, an MES can comprise a fixed terminal. An MES 654 can negotiate for and acquire a physical communication connection with a packet data service provider network 652 via an over-the-air ("OP"), i.e., wireless or radio, interface 658. Generally, the OP interface is the physical transmission interface, or link, between the MES 654 and a wireless packet data service provider network 652.

In a presently preferred embodiment, an MES 654 has a mobile station ("MS"), a data terminal adapter ("DTA") and data terminal equipment ("DTE"). The MS provides the communication interface, over-the-air, between the MES 654 and a packet data service provider network 652.

Figure 14A:
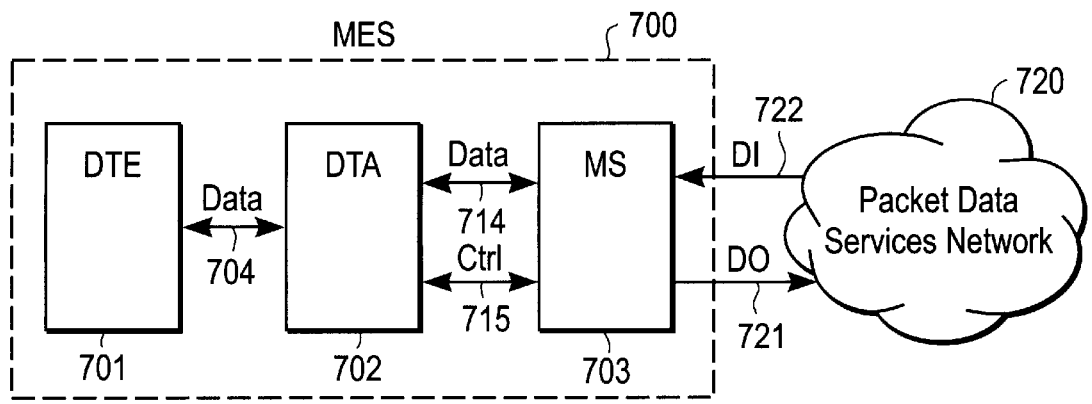
FIGS. 14A, 14B and 14C depict various different embodiments of a mobile end station.

In one embodiment, referring to FIG. 14A, the DTE 701, the DTA 702 and the MS 703 are physically separate units in the MES 700. In one example of this embodiment, the DTA 702 resides inside the DTE 701, in the form of a data terminal equipment ("DTE") card. In a presently preferred embodiment, the DTE 701 is a personal computer ("PC") and the DTE card is a PC card. In this example, the DTA 702 connects to the MS 703 by a cable. In another example of this embodiment, the DTA 702 is a separate unit on a cable that connects the MS 703 to a DTE RS-232 port.

In the MES 700, data 704 is passed between the DTE 701 and the DTA 702, and data 714 and control information 715 is passed between the DTA 702 and the MS 703.

Figure 14B:
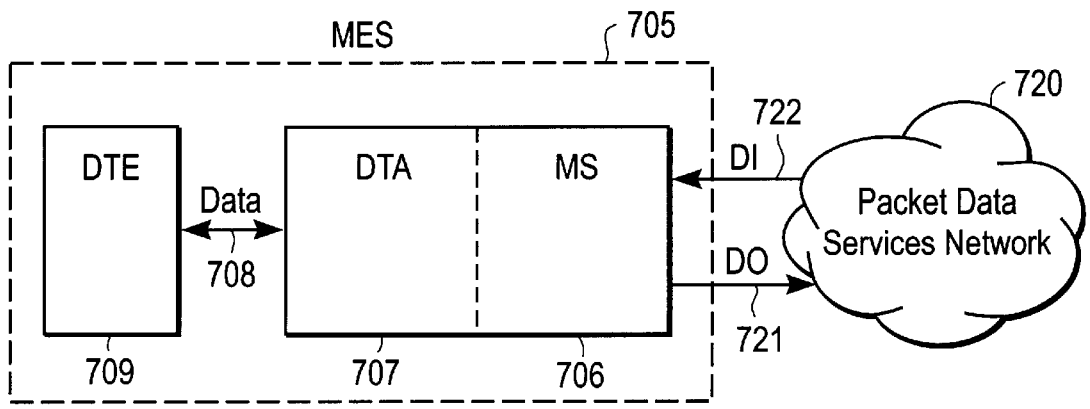

In another embodiment of an MES 705, referring to FIG. 14B, the MS 706 and the DTA 707 are incorporated into a single physical unit, while the DTE 709 remains a separate unit. In this embodiment, the combined MS 706 and DTA 707 connect to, and, thereby transfer data 708 to and from the DTE 709 via a serial port on the DTE 709. In a presently preferred embodiment, the DTE 709 is a PC.

Figure 14C:
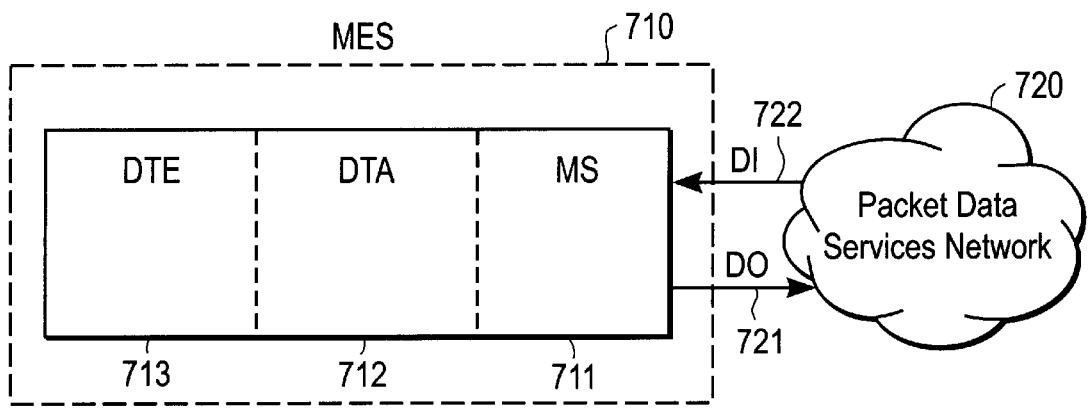

In yet another embodiment of an MES 710, referring to FIG. 14C, the MS 711, the DTA 712 and the DTE 713 are all incorporated into a single physical unit.

In each of the embodiments of an MES (700, 705 and 710 of FIGS. 14A, 14B and 14C respectively), data is transmitted out 721 of the MS to a packet data services network 720 and is received into 722 the MS from the packet data services network 720.

Referring again to FIG. 13, a packet data services network 650 provides a standard Internet Protocol ("IP") network layer service, and, therefore, generally all of the applications over the Internet are available via the packet data services network 650. Further, a packet data services network 650 enables an MES 654 to transmit and receive data to and from other entities, for example, e.g., external packet data networks 656 and/or other MESs 654, connected to the packet data services network 650. An MES 654 is an endpoint of communication in the wireless network 670, and, therefore, each MES 654 is a potential source and destination of network traffic, i.e., user messages.

In an embodiment, the entity transmitting packets is a BTS and the entity receiving packets is an MES. In another embodiment, the entity transmitting packets is an MES and the entity receiving packets is a BTS. In a presently preferred embodiment, both the MESs and the BTSs have a processor and associated memory for executing respective software instructions to accomplish the above-described aggregated acknowledgment mechanism.

Figure 15:
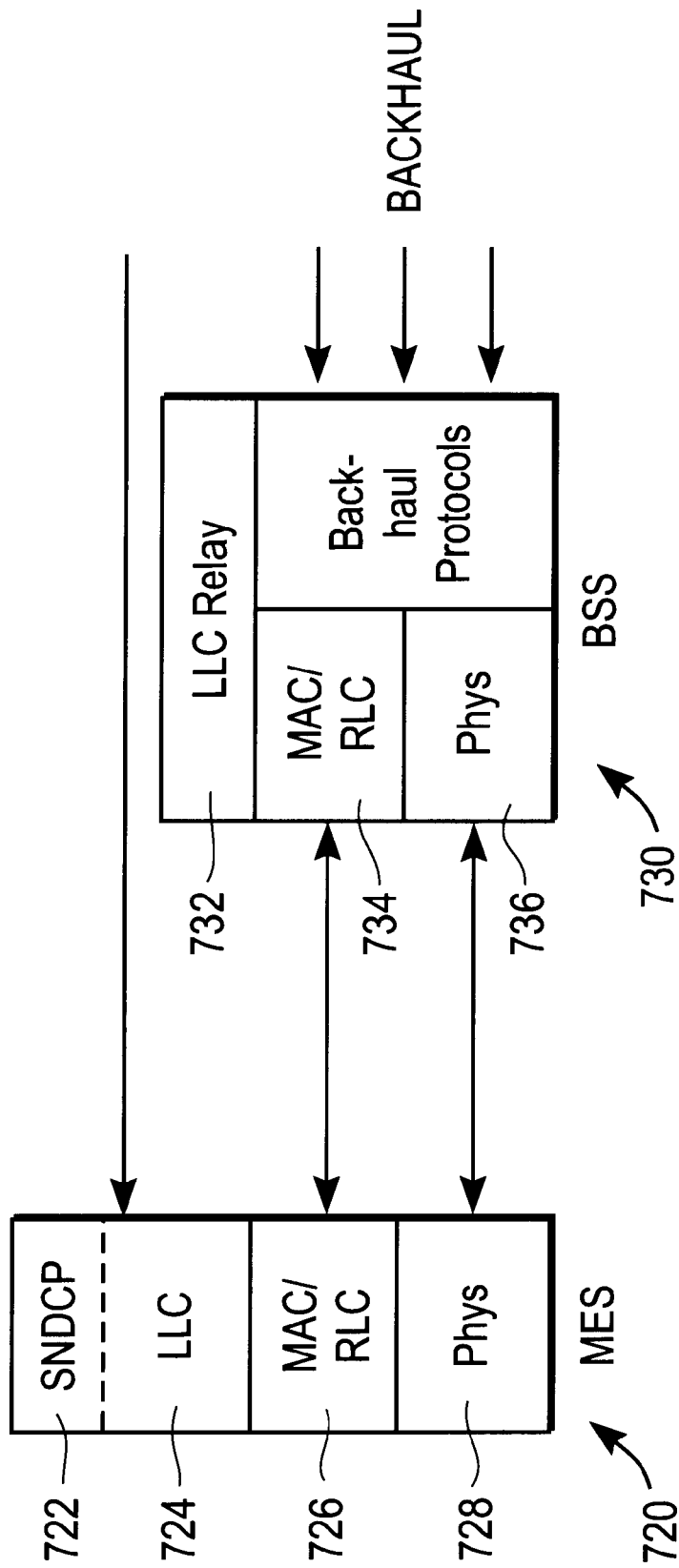
FIG. 15 illustrates an embodiment of a protocol stack for a mobile end station and an embodiment of a protocol stack for a base station subsystem.

Referring to FIG. 15, a presently preferred embodiment of a protocol stack for an MES and a presently preferred embodiment of a protocol stack for a base station subsystem ("BSS"), the protocol stacks generally describing protocol processing layers, is defined for the conveyance of information, e.g., messages, between a BTS and an MES. In the MES protocol stack 720, the sub-network dependent convergence protocol ("SNDCP") layer 722 can be viewed as a layer of the logical link control ("LLC") protocol layer 724. The SNDCP layer 722 provides mapping of Layer 3 Internet Protocol ("IP") packets onto LLC frames for transmission within a packet data services network. The SNDCP layer 722 provides data encryption, IP header compression and, in an embodiment, overall data compression.

The LLC protocol layer 724 of the MES protocol stack 720 provides a bi-directional, reliable logical link between the MES and a packet data service provider network. The LLC protocol layer 724 incorporates framing, addressing and flow control.

The media access control ("MAC")/radio link control ("RLC") protocol layer 726 of the MES protocol stack 720 provides access to and a link on the over-the-air interface between the MES and a BTS. More specifically, the RLC protocol provides a reliable link on the over-the-air interface and, further, supports the aggregated acknowledgement mechanism and procedures previously described. The MAC protocol, for its part, is responsible for access control of the MES to the over-the-air interface of a BTS, and comprises the radio resource control algorithms.

The physical protocol layer 728 of the MES protocol stack 720 provides the physical interface control for transmission between the MES and a BTS. In a presently preferred embodiment, the physical protocol layer 728 uses the IS-661 radio technology.

As with the physical protocol layer 728 in the MES protocol stack 720, the physical protocol layer 736 in the BSS protocol stack 730 provides the physical interface control for transmission between the respective BTS and an MES. In a presently preferred embodiment, the physical protocol layer 736 uses the IS-661 radio technology.

The media access control ("MAC")/radio link control ("RLC") protocol layer 734 of the BSS protocol stack 730 provides access to and a link on the over-the-air interface between the respective BTS and an MES. More specifically, the RLC protocol provides a reliable link on the over-the-air interface, and, further, supports the aggregated acknowledgement mechanism and procedures previously described. The MAC protocol, for its part, is responsible for the control of access of MESs to the respective BTS's over-the-air interface, and comprises the radio resource control algorithms.

The LLC relay protocol layer 732 of the BSS protocol stack 730 generally provides the relay of logical link frames within a packet data service provider network.

While embodiments are disclosed herein, many variations are possible which remain within the spirit and scope of the invention. Such variations are clear upon inspection of the specification, drawings and claims herein. The invention therefore is not to be restricted except by the scope of the appended claims.

What is claimed is as follows:

1. A method of transmission error control, comprising:
   transmitting at least one frame of packet data to a receiving entity during each of a plurality of time frames, each time frame comprising more than one time slot;
   receiving a plurality of responsive messages from said receiving entity, each of said responsive messages operable to identify a plurality of frames of data successfully received or unsuccessfully received during a current time frame and during prior time frames; and
   retransmitting each of said frames of data that said responsive message indicates as unsuccessfully received, at least one of the frames of data identified as unsuccessfully received being retransmitted in more than one time slot of a time frame.

2. The method of transmission error control of claim 1, wherein each of said responsive messages comprises a bit map, said bit map comprising a bit for each of said frames of said packet data.

3. The method of transmission error control of claim 2, wherein a bit of said bit map corresponding to a frame of said packet data is set to a value of one if said frame is successfully received by said receiving entity.

4. The method of transmission error control of claim 2, wherein a bit of said bit map corresponding to a frame of said packet data is set to a value of zero if said frame is not successfully received by said receiving entity.

5. The method of error control of claim 1, wherein said frames of packet data are transmitted on a wireless transmission interface and said plurality of responsive messages are received on said wireless transmission interface.

6. A method of transmission error control, comprising:
   attempting to receive at least one frame of packet data from a transmitting entity during each of a plurality of time frames, each time frame comprising more than one time slot;
   generating a responsive message after each of a plurality of the time frames, each of said responsive messages operable to identify a plurality of frames of data successfully received or unsuccessfully received during a current time frame and during prior time frames;
   transmitting said responsive message to said transmitting entity; and
   receiving at least one of the frames of data identified as unsuccessfully received, the frame of data being retransmitted by the transmitting entity in more than one time slot of a time frame.

7. The method of transmission error control of claim 6, wherein said responsive message is transmitted to said transmitting entity in the same time frame as said attempt to receive at least one frame of packet data.

8. The method of transmission error control of claim 6, wherein said responsive message comprises a bit map of bits and each bit of said bit map corresponds to a frame of said packet data.

9. The method of transmission error control of claim 8, wherein each bit in said bit map corresponding to a received frame of data is set to a value of one, prior to the transmission of said responsive message to said transmitting entity.

10. The method of transmission error control of claim 8, wherein a bit in said bit map of a first responsive message is set to a value of one to indicate a frame of data was received in a first time frame, and said first responsive message is transmitted in said first time frame, and said bit in said bit map of a second responsive message is set to a value of one, and said second responsive message is transmitted in a second time frame.

11. The method of transmission error control of claim 6, wherein said frames of data are received on a wireless transmission interface and said responsive message is transmitted on said wireless transmission interface.

12. An aggregated acknowledgment message, comprising:
   a message identification field; and
   a bit map comprising a plurality of bits, each bit having a first state and a second state, the first state indicating that a receiving entity successfully received a frame of data corresponding with the bit during a current time frame or during prior time frames, the second state indicating that the receiving entity did not successfully receive the frame of data corresponding with the bit during the current and prior time frames, the bit map operable to identify a plurality of frames of data successfully received or unsuccessfully received, at least one of the successfully received frames of data having been retransmitted by a transmitting entity in more than one time slot of a time frame.

13. The aggregated acknowledgment message of claim 12, wherein a bit of said bit map is set to a value of one if the corresponding frame of data is received by a receiving entity.

14. The aggregated acknowledgment message of claim 12, wherein said bit map is comprised of a number of bits corresponding to the maximum number of frames of packet data to be transmitted in a wireless communication system.

15. The aggregated acknowledgement message of claim 14, wherein said maximum number of frames is seventy-nine.

16. A system for transmission error control, comprising:
   at least one computer readable medium; and
   software encoded on the at least one computer readable medium and operable when executed by a processor to:
      transmit at least one frame of packet data to a receiving entity during each of a plurality of time frames, each time frame comprising more than one time slot;
      receive a responsive message from the receiving entity, the responsive message operable to identify a plurality of frames of data successfully received or unsuccessfully received during a current time frame and during at least one prior time frame; and
      retransmit at least one of the frames of data identified as unsuccessfully received in more than one time slot of a time frame.

17. A system for transmission error control, comprising:
   a memory operable to store a plurality of frames of packet data; and
   a processor coupled to the memory and operable to:
      transmit at least one of the frames of packet data to a receiving entity during each of a plurality of time frames, each time frame comprising more than one time slot;
      receive a responsive message from the receiving entity, the responsive message operable to identify a plurality of frames of data successfully received or unsuccessfully received during a current time frame and during at least one prior time frame; and
      retransmit at least one of the frames of data identified as unsuccessfully received in more than one time slot of a time frame.

18. A system for transmission error control, comprising:
   at least one computer readable medium; and
   software encoded on the at least one computer readable medium and operable when executed by a processor to:
      attempt to receive at least one frame of packet data from a transmitting entity during each of a plurality of time frames, each time frame comprising more than one time slot;
      generate at least one responsive message operable to identify a plurality of frames of data successfully received or unsuccessfully received during a current time frame and during at least one prior time frame;
      transmit the responsive message to the transmitting entity; and
      receive at least one of the frames of data identified as unsuccessfully received, the frame of data being retransmitted by the transmitting entity in more than one time slot of a time frame.

19. A system for transmission error control, comprising:
   a memory operable to store a bit map, the bit map comprising a plurality of bits and being operable to identify a plurality of frames of data successfully received or unsuccessfully received; and
   a processor coupled to the memory and operable to:
      attempt to receive at least one frame of packet data from a transmitting entity during each of a plurality of time frames, each time frame comprising more than one time slot;
      set at least one of the bits in the bit map to a first state or a second state, the first state indicating that a frame of data was successfully received during a current time frame or during a prior time frame, the second state indicating that the frame of data was unsuccessfully received during the current and prior time frames;
      generate at least one responsive message using the bit map;
      transmit the responsive message to the transmitting entity; and
      receive at least one of the frames of data identified as unsuccessfully received, the frame of data being retransmitted by the transmitting entity in more than one time slot of a time frame.

* * * * *

Disclaimer and Dedication 6,301,249—Carl Mansfield, Portland, OR; Izzet M. Bilgic, Colorado Springs, CO; Benjamin K. Gibbs, Colorado Springs, CO; Sherman L. Gavette, Colorado Springs, CO. EFFICIENT ERROR CONTROL FOR WIRELESS PACKET TRANSMISSIONS. Patent dated October 9, 2001. Disclaimer filed May 2, 2002 by the assignee, Opuswave Networks, Inc.

Hereby disclaims and dedicates to the Public entire term of said patent
*(Official Gazette, August 13, 2002)*